(12) United States Patent
Bygrave

(10) Patent No.: US 10,251,013 B2
(45) Date of Patent: Apr. 2, 2019

(54) AUDIO PROPAGATION IN A VIRTUAL ENVIRONMENT

(71) Applicant: Microsoft Technology Licensing, LLC, Redmond, WA (US)

(72) Inventor: Nicholas Bygrave, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/618,061

(22) Filed: Jun. 8, 2017

(65) Prior Publication Data

US 2018/0359591 A1    Dec. 13, 2018

(51) Int. Cl.
*H04R 5/00* (2006.01)
*H04S 7/00* (2006.01)
*H04S 3/00* (2006.01)

(52) U.S. Cl.
CPC .............. *H04S 7/303* (2013.01); *H04S 3/008* (2013.01); *H04S 2400/01* (2013.01); *H04S 2400/11* (2013.01)

(58) Field of Classification Search
CPC ...... H04S 7/303; H04S 3/008; H04S 2400/01; H04S 2400/11
USPC ...................... 381/17, 300, 303, 310; 700/94
See application file for complete search history.

(56) References Cited

U.S. PATENT DOCUMENTS

| 7,113,610 | B1 | 9/2006 | Chrysanthakopoulos |
| 7,194,117 | B2 | 3/2007 | Kaufman et al. |
| 7,881,479 | B2 | 2/2011 | Asada |
| 8,525,834 | B2 | 9/2013 | Salemann |
| 2007/0294061 | A1 | 12/2007 | Carlbom et al. |
| 2008/0069367 | A1 | 3/2008 | Gerrard et al. |
| 2011/0164769 | A1 | 7/2011 | Zhan et al. |
| 2012/0249556 | A1 | 10/2012 | Chandak et al. |

(Continued)

FOREIGN PATENT DOCUMENTS

| JP | S61261997 A | 11/1986 |
| WO | 2012037073 A1 | 3/2012 |
| WO | 2014146668 A2 | 9/2014 |

OTHER PUBLICATIONS

Sodenberg, Martin A Lindell, Rikard, Enhancing the audio environment in virtual city scenes, 2008, pp. 1-30.*

(Continued)

*Primary Examiner* — Vivian Chin
*Assistant Examiner* — Ammar Hamid

(57) ABSTRACT

The methods described herein are configured to accurately propagate sound through a virtual environment. During runtime of an application using the virtual environment, a shortest path is calculated from a sound source in a first zone to a sound destination in a second zone that passes through at least one portal. The direction of the calculated shortest path from the portal to the sound destination is determined. Then, a virtual sound source is generated based on the length and determined direction of the calculated path. Further, obstructions in the virtual environment are processed to determine an attenuation of audio data associated with the sound source. The generated virtual sound source and the attenuated audio data are provided to an audio engine for rendering to a user. Propagating sound using a combination of these methods provides an accurate, realistic sound experience in the virtual environment.

20 Claims, 17 Drawing Sheets

(56) References Cited

U.S. PATENT DOCUMENTS

2015/0057083 A1 2/2015 Mehra et al.
2015/0373475 A1 12/2015 Raghuvanshi et al.

OTHER PUBLICATIONS

Zheng,, "Multi-voxel Patterns Reveal Functionally Differentiated Networks Underlying Auditory Feedback Processing of Speech", In Journal of Neuroscience, vol. 33, Issue 10, Mar. 6, 2013, pp. 1-24.
Tsingos, et al., "Modeling Acoustics in Virtual Environments Using the Uniform Theory of Diffraction", In Proceedings of 28th Annual Conference on Computer Graphics and Interactive Techniques, Aug. 12, 2001, pp. 545-553.
Stephenson, Uwe Martin, "Analytical Derivation of the Reduction of Computation Time by the Voxel Crossing Technique", In Proceedings of Joint Congress CFA/DAGA, Mar. 22, 2004, pp. 247-248.
"International Search Report and Written Opinion Issued in PCT Application No. PCT/US2018/033570", dated Nov. 26, 2018, 18 Pages.

\* cited by examiner

AUDIO PROPAGATION IN A VIRTUAL ENVIRONMENT

BACKGROUND

With the advent of increasingly realistic virtual environments in video games, virtual reality applications, and the like, accurate sound and audio propagation has become necessary to enhance the virtual experience. For sounds/audio to feel like a part of the environment, they must react to and/or be affected by aspects of the environment as they travel to the listener. Using a simple line-of-sight ray-cast method between a sound source and a sound destination to determine obstruction of a sound provides a simple way of affecting sound properties based on the environment, but in more complex settings, it is not realistic. For instance, if a sound is propagated based on a simple binary obstruction value, strange effects may be produced when the sound destination or listener moves around within the environment (e.g., turning corners, moving through doors, etc.) where sound volume and/or clarity make sudden jumps that do not accurately mimic sound in the physical world, reducing immersion of a player in the virtual environment.

In some existing systems, the binary obstruction values may be used to apply filtering and/or attenuation to sound properties. But because the binary values provide only minimal information (e.g., the sound is obstructed or unobstructed, etc.), accurately filtering and/or attenuating the sound across a wide range of possible situations is impossible. Situations such as listening to a sound from a different room, traveling through corridors, through doorways between rooms, around corners and other obstructions, etc. in a virtual environment demand highly flexible, granular sound propagation techniques to produce an accurate audio experience to match modern virtual environments.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method comprises calculating a shortest path from a sound source in a first zone of the virtual environment to a sound destination in a second zone of the virtual environment that passes through at least one portal. The direction of the calculated shortest path from the portal to the sound destination is determined. Then, a virtual sound source is generated based on the length and determined direction of the calculated path. Further, a direct obstructed voxel path between the sound source and the sound destination and an unobstructed voxel path between the sound source and the sound destination are compared to determine an attenuation of audio data associated with the sound source. The generated virtual sound source and the attenuated audio data are provided to an audio engine for rendering to a user.

Many of the attendant features will be more readily appreciated as the same becomes better understood by reference to the following detailed description considered in connection with the accompanying drawings.

BRIEF DESCRIPTION OF THE DRAWINGS

Corresponding reference characters indicate corresponding parts throughout the drawings. In FIGS. 1 to 17, the systems are illustrated as schematic drawings. The drawings may not be to scale.

DETAILED DESCRIPTION

Figure 1:
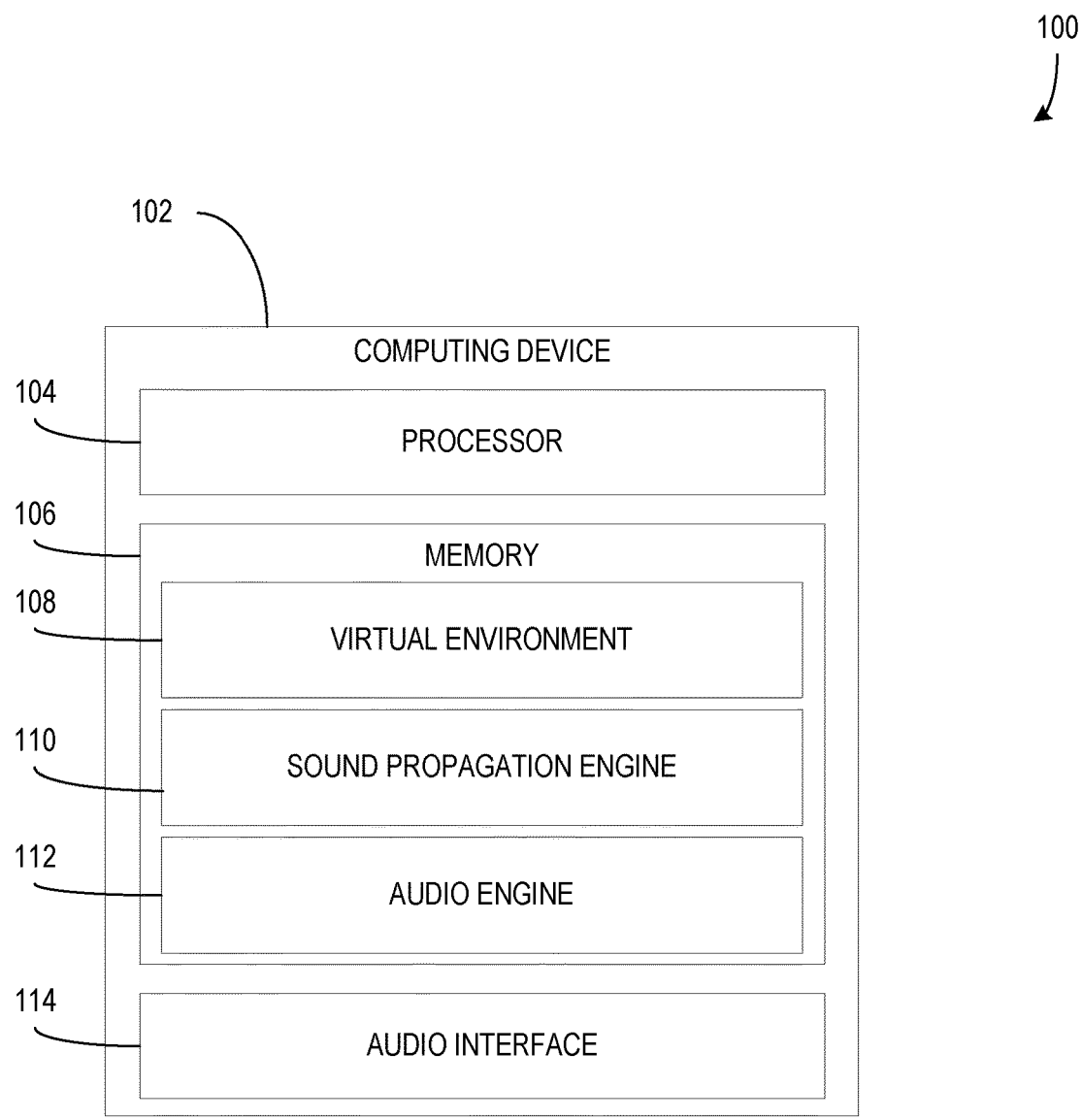
FIG. 1 is an exemplary block diagram illustrating a system including a computing device configured to propagate sound in a virtual environment according to an embodiment.

In the systems described below, sound between regions in a virtual environment is propagated based on zones of an environment connected by portals. Through the use of zone-portal combinations, diffraction of sounds around corners and travel of sounds through various combinations of rooms, corridors, doorways, windows, etc. is simulated. Virtual sound sources are generated in relation to listeners or other sound destinations based on audio data of the original sound sources combined with the effects of the path along which a sound travels to reach a sound destination. If there is more than one valid path through the environment, the valid paths may be weighted and averaged to arrive at a weighted average virtual sound source, accounting for a sound spreading out through the environment, diffracting around corners, and reaching a sound destination along the various paths at various intensities, etc.

In addition, the sound propagation may include finding paths circumventing obstructions in the environment and attenuating, filtering, or otherwise altering audio data based on a degree to which the unobstructed path departs from a direct path. This aspect accounts for objects or other obstacles that may be present within a zone of the virtual environment, in addition or alternatively to the zone-to-zone aspects of sound propagation described herein. The regions of the virtual environment may be voxelized, improving the accuracy of path finding around obstructions within the zones. In combining these two techniques, a hybrid voxel/geometric model of the environment's acoustics is created for sound propagation.

The user experience within the virtual environment is improved by the use of the sound propagation techniques described herein. Accurate propagation is provided, including flexible, granular occlusion, attenuation, filtering, and/or altering of sounds based on aspects of the virtual environment. Further, the inclusion of zones and portals provides efficient voxelization processing, as the voxelization can be limited only to those zones as desired, rather than voxelizing the entire environment at once. Further, because the environment may be divided into separate zones, processing in general may be made more efficient by selectively processing specific zones as desired.

The detailed description provided below in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'computing apparatus', 'mobile device', 'computing device' and the like are used herein to refer to any device with processing capability such that it can execute instructions. Those skilled in the art will realize that such processing capabilities are incorporated into many different devices and therefore the terms 'computer' and 'computing apparatus' each may include PCs, servers, laptop computers, mobile telephones (including smart phones), tablet computers, media players, games consoles, personal digital assistants, and many other devices.

The computing devices and methods described below are configured to provide accurate sound propagation and occlusion in a virtual environment based on aspects/entities of the virtual environment. Providing convincing sounds in a virtual environment (e.g., a video game, etc.) complements the visuals, location, and setting of the virtual environment, enhancing the user's immersion. The way that sounds react to and are affected by aspects of the environment plays a large role in providing an accurate audio experience. The disclosure improves the functioning of devices at least by reducing processor and memory usage during audio processing.

FIG. 1 is an exemplary block diagram illustrating a system including a computing device 102 configured to propagate sound in a virtual environment 108 according to an embodiment. The computing device 102 includes a processor 104, a memory 106, and an audio interface 114. The memory 106 stores data associated with or otherwise includes a virtual environment 108, a sound propagation engine 110, and an audio engine 112.

The virtual environment 108 may be displayed, played, or otherwise rendered to a user based on the execution of instructions in the memory 106 by the processor 104. Sound or audio aspects of the virtual environment 108 may be rendered to a user by the audio interface 114, which may include, for instance, interface(s) for use with speakers, headphones, or the like in various configurations (e.g., mono, stereo, 2.1, 3.1, 5.1, 7.1, etc.). The audio interface 114 may enable the use of wired or wireless audio hardware (e.g., the audio interface 114 may include a headphone jack, BLUETOOTH wireless capability, etc.).

The sound propagation engine 110 determines how a sound in the virtual environment 108 propagates based on the arrangement of entities in the virtual environment 108 (e.g., rooms, walls, doors, furniture, other obstructions, etc.) and on aspects of the sound being propagated (e.g., volume, direction, source location, etc.).

The audio engine 112 receives audio data from the sound propagation engine 110 and converts or otherwise transforms it such that the transformed audio data is compatible for use with the audio interface 114.

Figure 2:
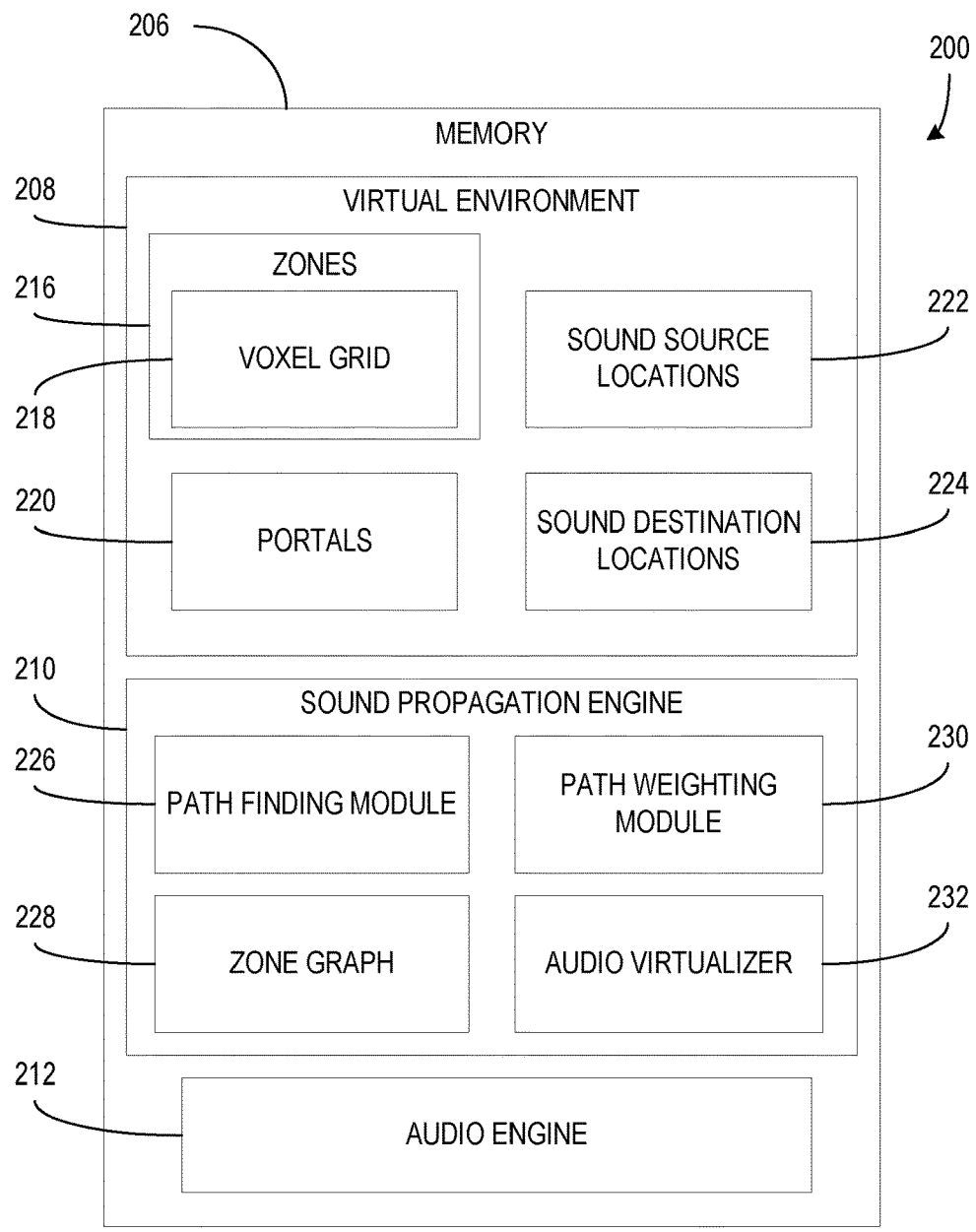
FIG. 2 is an exemplary block diagram illustrating a system including a computing device configured to propagate sound via a sound propagation engine in a virtual environment including zones and portals according to an embodiment.

FIG. 2 is an exemplary block diagram illustrating a system including a computing device with memory 206 configured to propagate sound via a sound propagation engine 210 in a virtual environment 208 including zones 216 and portals 220 according to an embodiment.

The virtual environment 208 is made up of zones 216 which may include voxel grids 218, portals 220, sound source locations 222, and a sound destination location 224. A zone 216, or cell, is a volume (e.g., a concave volume, etc.) within the virtual environment 208 that is defined to include boundaries, bounding boxes, or the like within the virtual environment 208. A zone 216 contains points of the virtual environment 208 that are located within the boundaries of the zone 216. A zone 216 may further include attributes such as translation and rotation within the world space of the virtual environment 208. Additionally, a zone 216 may contain or be associated with entities such as portals 220, sound source locations 222, sound destination locations 224, and/or even other zones 216 (zones within zones are "nested zones"). For instance, nested zones may include a room within a room, such that a path finding algorithm as described herein considers the shortest path around an inner nested zone by treating it as a solid voxelized space inside the outer nested zone. The path may then be compared to a shortest zone path between the start and end points (e.g., a sound source location outside the inner nested zone and a sound destination location inside the inner nested zone, etc.) that passes through the inner nested zone's portals. Alternatively, or additionally, entities of the virtual environment 208 may also be located outside of a zone 216 (e.g., inside of another nearby zone, outside of all defined zones, etc.).

In some examples, a zone 216 is in the shape of a box, or cuboid, which may provide advantages in processing performance over other shapes. Alternatively, a zone 216 may be in the shape of a mesh or any other concave volume that can be used to test if a point of the virtual environment 208 is within the boundaries of the zone.

A voxel grid 218 of a zone 216 includes a plurality of voxels (e.g., smaller volumes of the virtual environment 208, etc.) that make up the volume of the zone 216. In an example, the voxels making up a voxel grid 218 are identically sized and arranged in an axis-aligned pattern with respect to the orientation of zone 216 to fill the volume of the zone 216. For instance, a box-shaped zone 216 may include a voxel grid 218 of box-shaped voxels that fill the volume of the zone 216. The resolution or density of voxels in a voxel grid 218 may be defined independently for each zone 216 or for the entire virtual environment 208. A voxel grid 218 is generated for a zone 216 based on the zone 216 being flagged or otherwise identified for voxelization. Voxelization is done in an offline mode, prior to the virtual environment 208 being used for playing a game or other similar live interactive program. Alternatively, or additionally, in some cases voxelization of a zone 216 may be done at runtime (e.g., if terrain in a game is destructible, it may be necessary to re-voxelize a zone 216 that has been altered by terrain destruction, etc.). In an example, voxelization of zones 216 may be limited to those zones that include or may include a sound source location 222 or a sound destination location 224. In a further example, voxelization of a zone may be avoided when the zone is relatively free of obstructions.

In some examples, each voxel includes an obstructed attribute that indicates whether the voxel is occupied by an object or other matter of the virtual environment 208. An object may occupy one or more voxels of the voxel grid 218. For instance, a table in the virtual environment may occupy many of the voxels of a voxel grid 218 of a zone 216. Alternatively, a pebble in the virtual environment 208 may only occupy a single voxel of the voxel grid 218. In an example, a voxel grid is stored as a three-dimensional grid of binary digits, wherein a '1' may mean the voxel is obstructed and a '0' may mean the voxel is unobstructed.

Once a zone 216 is voxelized, the voxel grid 218 enables the zone 216 to be queried to find paths from point to point within the zone 216. A shortest unobstructed path from point to point within the zone 216 may be found using the voxels and the obstructed attributes thereof. The path finding process may identify paths from point to point passing through only voxels that are unobstructed and then determine the shortest of the identified unobstructed paths. In some examples, an identified path may be "string-pulled" (e.g., tightening the path against bordering obstructed voxels to minimize path length, etc.) to find the absolute shortest possible path length from point to point (e.g., point to point within the zone). For instance, a string-pull algorithm may be applied to shorten a path using an iterative process that walks the path and removes middle waypoints in each set of three waypoints along the path, and tests whether the new line formed by the remaining two waypoints is unobstructed and/or intersects a portal. If the new line is unobstructed and/or still intersects a portal, the line is moved to the portal intersection point or a point in close proximity to the obstruction along the new line. If the new line is obstructed and/or does not intersect a portal, the new line is moved to the nearest obstruction or portal edge. The string-pull algorithm is repeated down the entire length of a path, across all waypoints, until its distance has been optimized around all obstructions and/or through portals (e.g., the new path length is not significantly shorter than the previous iteration). It should be understood that string-pull algorithms are generally known by a person of ordinary skill in the art and any known string-pull algorithm may be used without departing from the description herein. In a further example, the end points of a queried path may include points on the boundaries of the zone 216, such that paths through the zone 216 from portals 220 on the boundaries of zone 216 may be found.

In some examples, not all zones 216 are voxelized. Without a voxel grid 218, a shortest path from point to point within zone 216 is a straight line between the points, as there is no obstruction information without a voxel grid 218.

Portals 220 are two-dimensional shapes, or may have a depth, that mark or otherwise indicate a transition volume between two zones 216. A portal 220 may include a translation and/or rotation within the world space of the virtual environment 208. In some examples, a portal 220 is a quadrilateral shape on or near the boundaries of two zones 216, but in alternative examples, the portal 220 may be a mesh shape or any other appropriate shape (e.g., any shape that can have a string-pull algorithm applied to it, etc.).

In some examples, a portal 220 is a volume that has a transmissivity value. The transmissivity value indicates the ease with which a sound can propagate through the portal 220. The transmissivity value is used in determining a cost of a path passing through the portal 220. In some examples, transmissivity values of portals 220 are between zero and one, but other scales may also be used.

A high transmissivity indicates that a sound traveling through the portal 220 will pass through the portal 220 easily with little attenuation, occlusion, or filtering, while a low transmissivity indicates that the sound traveling through the portal 220 will be greatly attenuated, occluded, or filtered when passing through the portal 220, or that the sound will not pass through the portal 220 at all. For instance, an open door in the virtual environment 208 may be defined as a portal 220 with high transmissivity, while a brick wall next to the open door may be defined as another portal 220 with very low transmissivity. In some cases, the transmissivity of a portal 220 may change in real time, such as if an open door is closed, lowering the transmissivity of the associated portal, representing that sound travels more easily through the air of an open door than the wood, steel, or other material of a closed door.

Portals 220 may have a direction. In some examples, a Z axis value indicates a direction of passage through the portal 220. The portals 220 may be stored as two-dimensional shapes as viewed through the portal with the additional Z axis direction value.

The zones 216 and portals 220 may be stored as cuboid data structures in the form of a shape that covers a volume defined by an (x,y,z) coordinate, a length, a width, a height, and a rotation value. A cuboid form may enable simpler processing than other possible shapes.

The acoustic aspects of the virtual environment 208 may be described entirely based on zones 216, voxel grids 218, and portals 220. Upon creation of sound source locations 222 and sound destination locations 224 in the virtual environment 208, the propagation of associated sounds from the sound source locations 222 to the sound destination locations 224 may be determined based on the defined zones 216, voxel grids 218, and portals 220, as described herein.

Sound source locations 222 and sound destination locations 224 may be positioned or located at points within the virtual environment 208. The locations 222 and 224 may be within one or more zones 216, and sounds/audio may be propagated through the virtual environment 208, through zones 216 and portals 220, from source locations 222 to destination locations 224. Sound source locations 222 may represent people, animals, objects, events, or the like within the virtual environment 208 that are configured to cause sound to be emitted and/or propagated throughout the virtual environment 208. A sound source of a sound source location 222 may be associated with audio properties and/or data, including position, direction, volume or intensity, and obstruction/occlusion values, etc. Sound destination locations 224 may similarly represent people, animals, objects, or the like that are configured to capable of hearing, listening, or otherwise receiving sound that is propagated throughout the virtual environment 208. While many examples herein include only a single sound source location 222 and a single sound destination location 224, it should be understood that, in alternative examples, more and/or different sound source locations 222 and sound destination locations 224 are possible without departing from the scope herein.

In some examples, the entities of the virtual environment 208, including the zones 216, portals 220, sound source locations 222, and sound destination locations 224 are designed by engineers, programmers, designers or the like. Alternatively, or additionally, some or all of the virtual environment 208 entities may be generated automatically where possible.

The sound propagation engine 210 is configured to analyze sound and/or audio data within the context of the virtual environment 208 and determine how the sound should propagate in order to realistically mimic the propagation of sound in the physical world. In order to produce a realistic sound propagation, the sound propagation engine 210 alters the properties and/or audio data of a sound source based the context of the virtual environment 208 to create a virtual sound source including a position, volume or intensity, direction, obstruction/occlusion values, etc. The sound propagation engine 210 includes a path finding module 226, a zone graph 228, a path weighting module 230, and an audio virtualizer 232.

The path finding module 226 is configured to identify paths through the virtual environment 208 from one point to another (e.g., from a sound source location 222 to a sound destination location 224, etc.). A path may be represented as a list of waypoints through the virtual environment 208 that accounts for zones and portals through which it passes. A path can be a simple straight line from a source to a destination, or it may be made up of a plurality of path segments passing around obstructions and through portals, etc. In some cases, when a path is identified, it may be "string-pulled" to achieve the shortest possible path accounting for any associated obstructions, portals, or the like.

In some examples, the path finding module 226 makes use of a zone graph 228 of the zones 216 of the virtual environment 208. The zone graph 228 is a directed graph of nodes and connections representing all the valid traversals for a sound between a source location 222 and a destination location 224. A zone graph 228 is created by creating nodes at the entry and exit point of each portal 220 and for the source location 222 and the destination location 224. Connections between the nodes are created for each traversal across a zone between the portals 220 and the source location 222 and the destination location 224. For instance, an intra-zone connection is created between the node representing the source location 222 and the nodes of all portals 220 of the zone 216 in which the source location 222 is located.

In another example, a first portal of a first zone is positioned adjacent to a second portal of a second zone, such that sound may propagate from the first zone to the second zone via the first and second portals. The first and second portals are each represented by a separate node in the zone graph and there is a connection between the nodes of the first and second portals.

Each connection includes a distance value indicating the distance between the represented entities (e.g., portals, source locations, destination locations, etc.) and a transmission value that indicates a cost to travel between the two nodes (e.g., a degree to which obstructions must be circumvented, the ease of passing through a portal based on transmissivity, etc.). For instance, a portal with a low transmissivity value may be represented in the zone graph by two portal nodes with a high-cost connection between them. Using the nodes and connections of the zone graph 228, the path finding module 226 may identify valid paths between points in the virtual environment 208 and determine a distance of travel and/or a cost of travel for sound propagating on the identified paths.

In some examples, the path finding module 226 identifies each valid path from a sound source location 222 to a sound destination location 224 via all of the portals 220 of the zones 216 in which the locations 222 and 224 are positioned. As a result, many valid paths for sound propagation may be identified, and each valid path has a travel distance and/or a propagation cost.

The path weighting module 230 applies weights/priorities to the identified valid paths to determine a weighted average path for sound propagation from a generated virtual sound source. The weights are applied to the valid paths based on the associated distance values and transmission values. Closer and/or less obstructed paths receive greater weights than farther and/or more obstructed paths, such that the sound is propagated along a weighted average path closer to the more direct valid paths (See FIGS. 8, 9, and 13 for examples of a weighted average path/virtual sound source).

In some examples, the transmissivity value of portals affects the weights of the paths that pass through the portals. At runtime, portals can transition between different transmissivity values as doors/windows open and close, etc. The path weighting module 230 may change the weights applied to considered paths as the transmissivities of the associated portals change, causing the weighted average path to shift toward the "path of least resistance" as portals open/close, etc.

Further, the weights of the paths may change as the sound source or sound destination move in zones or between zones, such that the path weighting module 230 recalculates the weighted average path (and any associated virtual sound source) at regular or irregular intervals to maintain accurate sound propagation throughout changes. For instance, as a player's character (the sound destination) in a game approaches a door, sound from the other side of the door may gradually become clearer and/or more directed from the location of the door.

The audio virtualizer 232 re-locates, attenuates, occludes, filters, or otherwise alters the audio properties/data of a sound source to be propagated based on the distance and/or cost of weighted average path of the path weighting module 230. The degree to which a sound is attenuated may be based on defined formula. For instance, voxel path attenuation is attenuation for sound on an obstructed path based on a ratio of the length of a straight-line path from point to point if no obstructions were present to the length of the shortest path from point to point that circumvents the obstructions. Zone graph attenuation is based on the accumulation of turns plus the distance of the path, as described below. Alternatively, or additionally, a distance attenuation formula (e.g., a distance falloff formula such as the inverse of the distance squared, etc.) may be applied based on the behavior of sound dissipating over distance in the physical world. The attenuation may further be adjusted based on a diffraction factor based on the total diffraction of a path, etc.

In addition to adjusting the intensity of a sound, the audio virtualizer 232 may also adjust other properties of a sound, such as altering the mix of frequencies of the propagated sound to muffle the sound, attenuating higher frequencies of a sound to simulate sound absorption, etc.

The sound propagation engine 210 manages the described sound propagation calculations for each pair of source and destination in the virtual environment 208. These calculations may require updates as aspects of the virtual environment 208 and/or the source and destination change over time. For instance, the sound propagation engine 210 updates calculations, valid paths, the zone graph 228, etc. as necessary when the source or destination move within zones or to different zones, or as zones move around, within, or through each other. It manages the path blending between all considered paths based on each path's weight to create the properties of the weighted average path and/or virtual sound source location, etc. In an example, if the sound destination moves through a portal between zones, the sound propagation engine 210 calculates weighted average paths for each zone based on the moving sound destination's position within the portal to provide a smooth transition from zone to zone. Further, the sound propagation engine generates a final set of properties for the weighted average path and/or virtual sound source including total diffraction angle, accumulated obstruction, virtual distance, and virtual direction. These properties can be used with the audio engine 212 to create the necessary values (e.g., occlusion values, obstruction values, etc.) for providing appropriate audio data to an audio interface. For example, the properties may be used to set occlusion and obstruction parameters in the audio engine 212 to affect the dry (obstruction) and wet and dry (occlusion) sound mix busses of a sound.

The sound propagation engine 210 may execute sound propagation processes as described herein at regular or irregular intervals. For instance, the sound propagation is done once for every frame of runtime. However, due to hardware and/or software limitations, it may be necessary to execute the sound propagation less often (e.g., once every 70 frames, etc.). Interpolation may be used to maintain sound propagation accuracy between executions.

In an example, the sound propagation engine 210 follows a set of defined rules:

If the sound source and sound destination are in the same zone, stop processing.

If the sound source and sound destination haven't moved since the last processing, stop processing.

If the sound source or the sound destination have moved to the same zone since the last processing, stop processing.

If the sound source and sound destination have moved but are within the same zones as last processing, only update the zone path endpoints (between the sound source/sound destination and respective immediate portals).

If the sound source or the sound destination have changed zones since the last processing, run the sound propagation process based on all the portals of the zone where the sound source is located and all the portals of the zone where the sound destination is located.

In addition to limiting the frequency of sound propagation processing generally, sound sources may be processed in a round-robin fashion, such that each sound source in the virtual environment is processed in succession.

Figure 3:
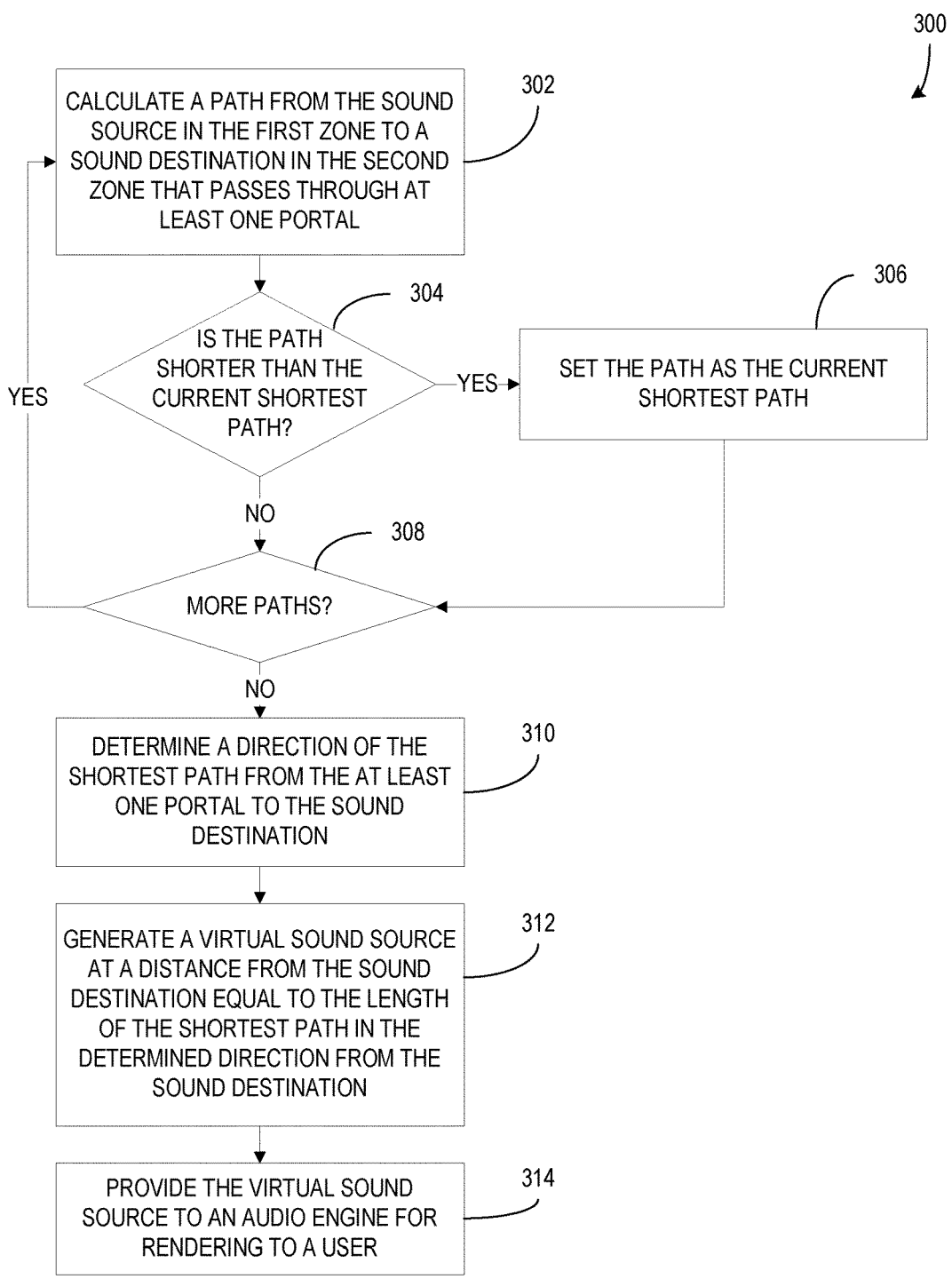
FIG. 3 is an exemplary flow chart illustrating operation of a computing device to generate a virtual sound source based on zones and portals of a virtual environment for propagating sound in the virtual environment according to an embodiment.

FIG. 3 is an exemplary flow chart 300 illustrating operation of a computing device to generate a virtual sound source based on zones and portals of a virtual environment for propagating sound in the virtual environment according to an embodiment. At 302, a path is calculated from a sound source in a first zone to a sound destination in a second zone through at least one portal. The path may be calculated by a path finding module 226 and/or other modules of a sound propagation engine 210. In an example, the first and second zones are adjacent and the path traverses through a portal shared by the first and second zones (or two directly adjacent portals on a shared boundary between the first and second zones). See, for instance, FIG. 6. Alternatively, the first and second zones may not be adjacent and there may be a third zone between the first and second zones, such that the path traverses at least two portals, one portal on the boundary of the first zone and a second portal on the boundary of the second zone. See, for instance, FIG. 7. In some examples, calculating the path may include applying a string-pull algorithm to the path after it has been identified to refine and/or minimize the length of the path. The use of a string-pull technique is especially important when dealing with large portals and/or portals that are near to the sound destination due to the substantial difference in distance and direction between edges of the portals.

The calculated path is compared to a current shortest path from the sound source to the sound destination at 304. If there is no current shortest path (e.g., the calculated path is the first path of the process, etc.) or if the current path is shorter than the current shortest path, the calculated path is set as the current shortest path at 306. The comparison of paths may be based on a length value or distance value of the paths (e.g., the shortest path is the path with the smallest distance value, etc.). Alternatively, or additionally, the comparison may also be based on obstruction values of the paths. For instance, a calculated path may be considered shorter than a current shortest path if it is less obstructed than the current shortest path, even if the distance value of the calculated path is longer than the current shortest path.

At 308, if there are more paths to be considered to find the shortest path, the process returns to 302. If there are no more paths to consider, the process continues to 310. The number of remaining paths to consider may be based on a path finding module 226 identifying all of the valid paths in a zone graph 228 as described above. After all of the valid paths from the sound source to the sound destination have been compared at 304, the current shortest path is identified as the shortest path from the sound source to the sound destination.

At 310, a direction of the shortest path is determined from the at least one portal to the sound destination. The determined direction is the direction from the sound destination to the portal through which the path traverses to enter the zone of the sound destination. In some examples, the direction may be directed toward an edge or corner of the portal closest to the sound destination because the shortest path traverses the portal along the closest edge or corner of the portal.

At 312, a virtual sound source is generated at a distance from the sound destination equal to the length of the shortest path and in the determined direction from the sound destination. The virtual sound source is generated in a location that represents where a listening entity at the sound destination perceives the sound to be coming from based on the context of the virtual environment (e.g., zones, portals, obstructions, etc.). For instance, if a path must travel around several corners to reach the sound destination, substantially increasing the length of the path in comparison to a straight-line path to the sound destination, the virtual sound source will be positioned farther away from the sound destination that the original sound source, representing the farther distance that the sound has to travel to reach the destination. In some examples, the virtual sound source may also include a diffraction value, or obstruction value based on the number and/or degree of turns that the path takes to reach the sound destination. The diffraction value may be used to attenuate or filter the sound from the virtual sound source to simulate additional costs of a sound reflecting off of walls and around corners.

In some examples, the virtual sound source is generated based on an average weighted path of all the considered paths from the zone graph as described above. The average weighted path that is calculated by a path weighting module 230 is used as the path for generating the virtual sound source, such that the direction of the average weighted path and the length of the average weighted path are used select the location of the virtual sound source. The average weighted path may be used to bias the virtual source position toward the most optimal path at any given time.

Once the virtual sound source is generated, it is provided to an audio engine for rendering to a user at 314. The virtual sound source and associated audio data may be converted or otherwise transformed for use at an audio interface by the audio engine.

Figure 4:
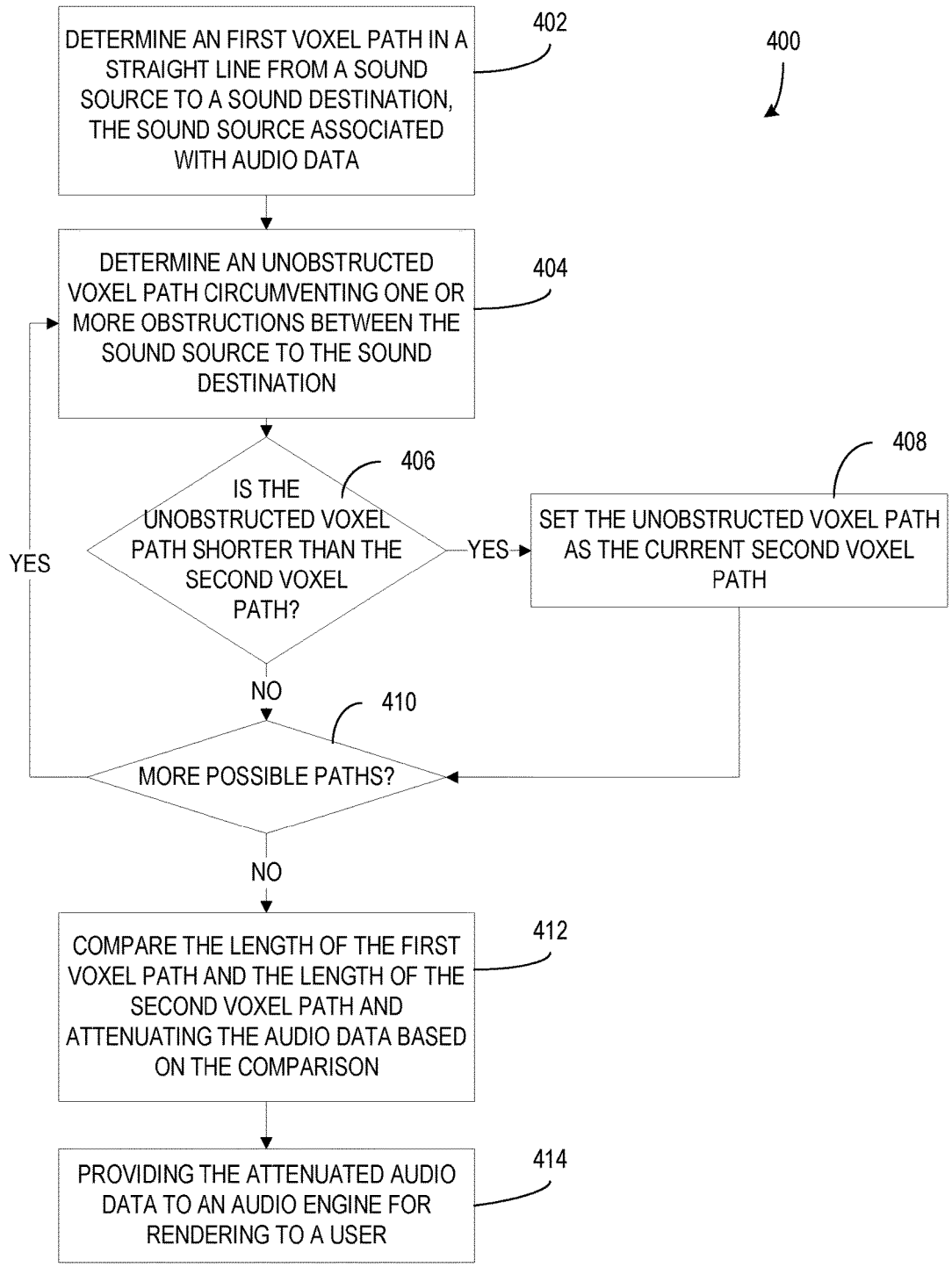
FIG. 4 is an exemplary flow chart illustrating operation of a computing device to attenuate audio data based on voxelized obstructions in a virtual environment for propagating sound in the virtual environment according to an embodiment.

FIG. 4 is an exemplary flow chart 400 illustrating operation of a computing device to attenuate audio data based on voxelized obstructions in a virtual environment for propagating sound in the virtual environment according to an embodiment. At 402, a first voxel path in a straight line from a sound source to a sound destination is determined. Further, the sound source is associated with audio data. The first voxel path may be obstructed by objects, walls, or other obstructions based on the voxels of the zone and/or virtual environment. At 404, an unobstructed voxel path is determined circumventing one or more obstructions between the sound source and the sound destination. The unobstructed voxel path may be longer than the first voxel path because the additional distance is required to circumvent the one or more obstacles.

At 406, the unobstructed voxel path is compared to a current second voxel path. The second voxel path is the current shortest unobstructed path that has been considered. The voxel paths are compared based on a distance/length value and/or an obstruction value. If the unobstructed voxel path is found to be shorter than the current shortest voxel path, it is set as the current second voxel path at 408. If there is no current second voxel path, the unobstructed voxel path is the first voxel path considered for the second voxel path and, as a result, it is set as the second voxel path at 408.

At 410, if there are more possible unobstructed voxel paths to consider, the process returns to 404. If there are no more possible unobstructed voxel paths to consider, the process continues to 412. The possible paths to consider may be calculated based on the voxelized data of the zone or zones in which the sound source and sound destination are located. The voxels of the zone(s) indicate whether they are occupied or obstructed, as described above. A path finding algorithm may be applied using the obstructed properties of the voxels to identify the possible paths that circumvent the obstructions in the zone(s).

At 412, the lengths of the first voxel path and the second voxel path are compared and the audio data of the sound source is attenuated, occluded, or filtered based on the comparison. In an example, an obstruction value is calculated based on the ratio of the length of the obstructed voxel path to the length of the shortest unobstructed voxel path, such that the obstruction value is a non-binary value that can be used to described how obstructed the sound should be. The obstruction value is applied to the audio data to attenuate it. In some examples, an audio virtualizer 232 is used to attenuate the audio data. After the audio data is attenuated, it is provided to an audio engine for rendering to a user at 414.

Figure 5:
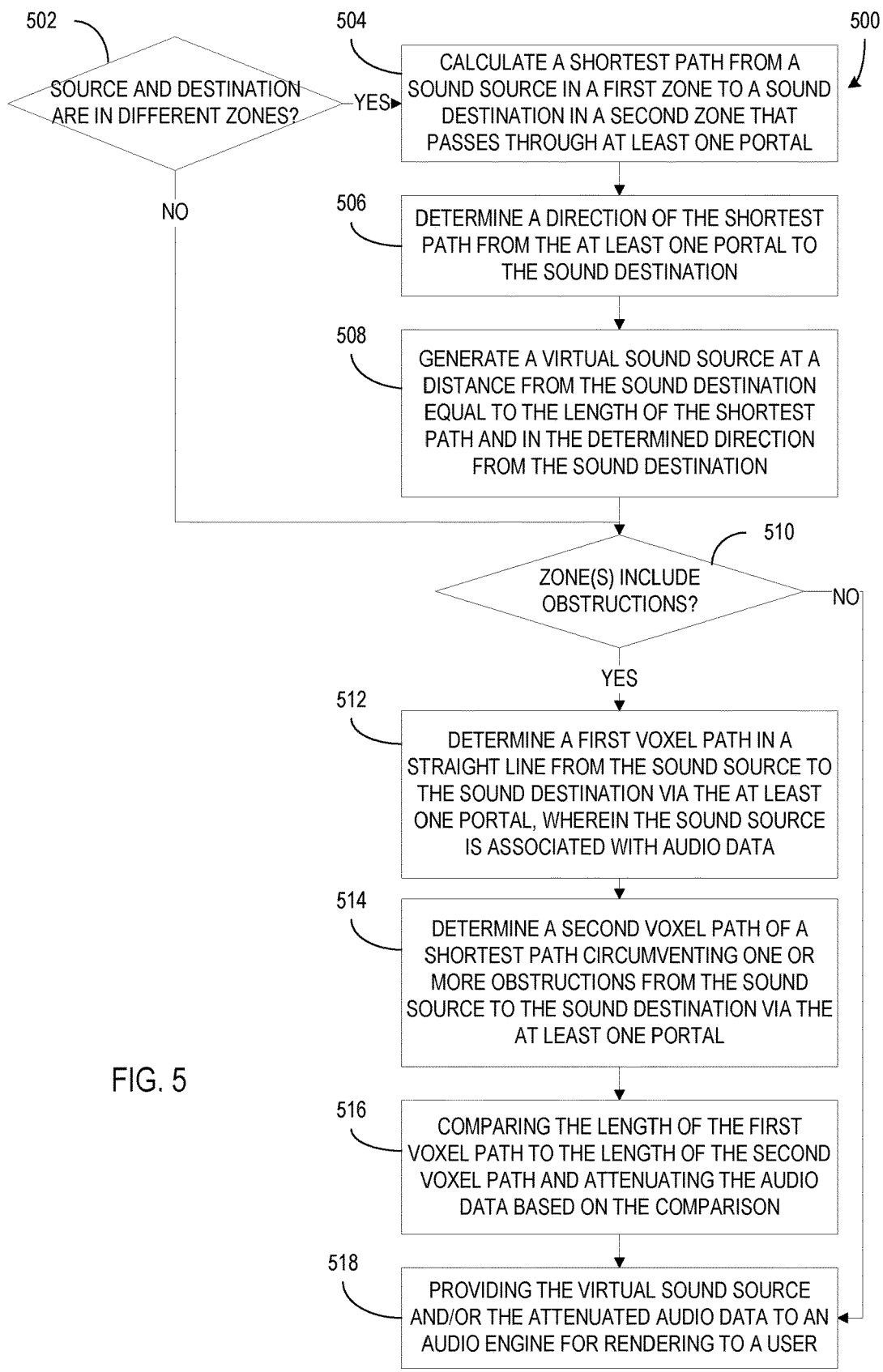
FIG. 5 is an exemplary flow chart illustrating operation of a computing device to generate a virtual sound source based on zones and portals of a virtual environment and to attenuate audio data based on voxelized obstructions in a virtual environment for propagating sound in the virtual environment according to an embodiment.

FIG. 5 is an exemplary flow chart 500 illustrating operation of a computing device to generate a virtual sound source based on zones and portals of a virtual environment and to attenuate audio data based on voxelized obstructions in a virtual environment for propagating sound in the virtual environment according to an embodiment. The methods of FIGS. 3 and 4 are combined in FIG. 5 to form a hybrid sound propagation method. If, at 502, the sound source and sound destination are in different zones, a shortest path is calculated from a sound source in a first zone to a sound destination in a second zone that passes through at least one portal at 504. Alternatively, if the sound source and sound destination are not in different zones at 502, the process proceeds to 510. As described above with respect to FIG. 3, the shortest path may be identified from a plurality of valid paths based on a zone graph (e.g., zone graph 228, etc.) of the virtual environment (e.g., virtual environment 208, etc.). At 506, a direction of the shortest path from the at least one portal to the sound destination is determined. The direction is used in generating a virtual sound source at 508. The virtual sound source is generated in a location that is in the determined direction and at a distance from the sound destination equal to the length of the calculated shortest path.

At 510, if a zone that includes either the sound source or the sound destination includes obstructions, a first voxel path in a straight line from the sound source to the sound destination via the at least one portal is determined at 512, wherein the sound source is associated with audio data. In some examples, the first voxel path includes multiple straight-line voxel path segments in order to account for the at least one portal. For instance, when the sound source and sound destination are in adjacent zones separated by a single portal, the first voxel path may include a first straight-line voxel path segment from the sound source to the portal and a second straight-line voxel path segment from the portal to the sound destination, such that the first voxel path may include a turn or angle based on the relative positions of the sound source, portal, and sound destination. The first voxel path may follow the calculated shortest path through the first and second zones and the at least one portal. Further, the first voxel path may pass through obstructed voxels in the first and second zones. Alternatively, if, at 510, the zone(s) of the sound source and the sound destination do not include substantial obstructions, the process proceeds to 518.

At 514, a second voxel path of a shortest path circumventing one or more obstructions from the sound source to the sound destination via the at least one portal is determined. The second voxel path is determined based on the obstruction values of the voxels of the first and second zones, as described above with respect to FIG. 4. The second voxel path may include voxel path segments in different zones, such as a first voxel path segment between the sound source and the portal in the first zone and a second voxel path segment between the portal and the sound destination in the second zone.

At 516, the audio data of the sound source is attenuated based on a comparison of the length of the first voxel path to the length of the second voxel path, as described above. In some examples, the comparison of the first voxel path and the second voxel path includes comparing associated voxel path segments in order to determine an attenuation per segment. For instance, the straight-line voxel path segment from the sound source to the portal may be compared to a voxel path segment circumventing obstructions between the sound source and the portal in the first zone and an attenuation of the first zone may be determined based on the comparison. Each of the straight-line voxel path segments (ignoring obstructions) of a voxel path may be compared to associated obstruction-circumventing voxel path segments to determine an attenuation of the associated segment/zone. The determined attenuations of each voxel path segment may then be applied to the audio data of the sound source.

The virtual sound source and the attenuated audio data is then provided to an audio engine for rendering to a user at 518. The attenuated audio data may be associated with the virtual sound source, such that, when the attenuated audio data is rendered in the virtual environment, it is perceived, at the sound destination, as originating from the virtual sound source. In some examples, if the sound source and sound destination are in the same zone and the zone does not include substantial obstructions, the sound source and associated data are provided to an audio engine without change of position or attenuation.

Figure 6:
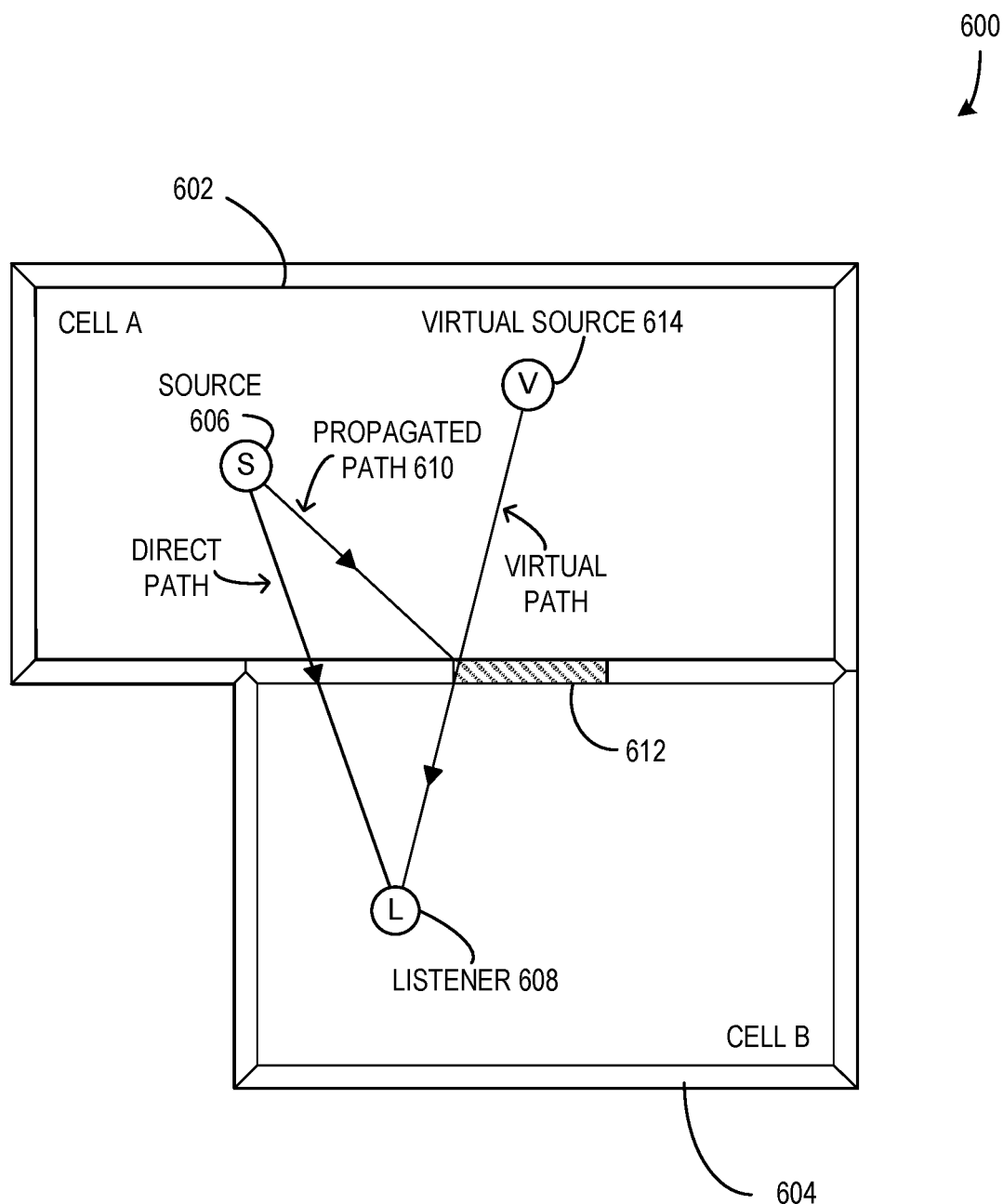
FIG. 6 is an exemplary two-dimensional representation of a virtual environment including two zones and a portal joining the two zones according to an embodiment.

FIG. 6 is an exemplary two-dimensional representation of a virtual environment 600 including two zones and a portal joining the two zones according to an embodiment. The illustrated virtual environment 600 includes zones 602 and 604, which are adjacent and joined by a portal 612. A sound source 606 is located in zone 602 and a sound destination 608 is located in zone 604. A shortest path 610 between the sound source 606 and the sound destination 608 via the portal 612 is illustrated. The path 610 traverses the portal 612 along the closest edge of the portal 612 to ensure that the path 610 is the shortest possible path. In an example, a string-pull algorithm has been applied to the path 610 as described above. A virtual sound source 614 has been generated at a location that is in the direction of the portal 612 edge from the sound destination 608 such that the sound from the virtual sound source is perceived as coming from the direction of the portal 612. The virtual sound source 614 has been generated at a distance from the sound destination 608 equivalent to the length of the path 610, such that the sound from the virtual sound source 614 is properly adjusted, filtered, or attenuated based on the distance traveled by the sound from the sound source 606.

Figure 7:
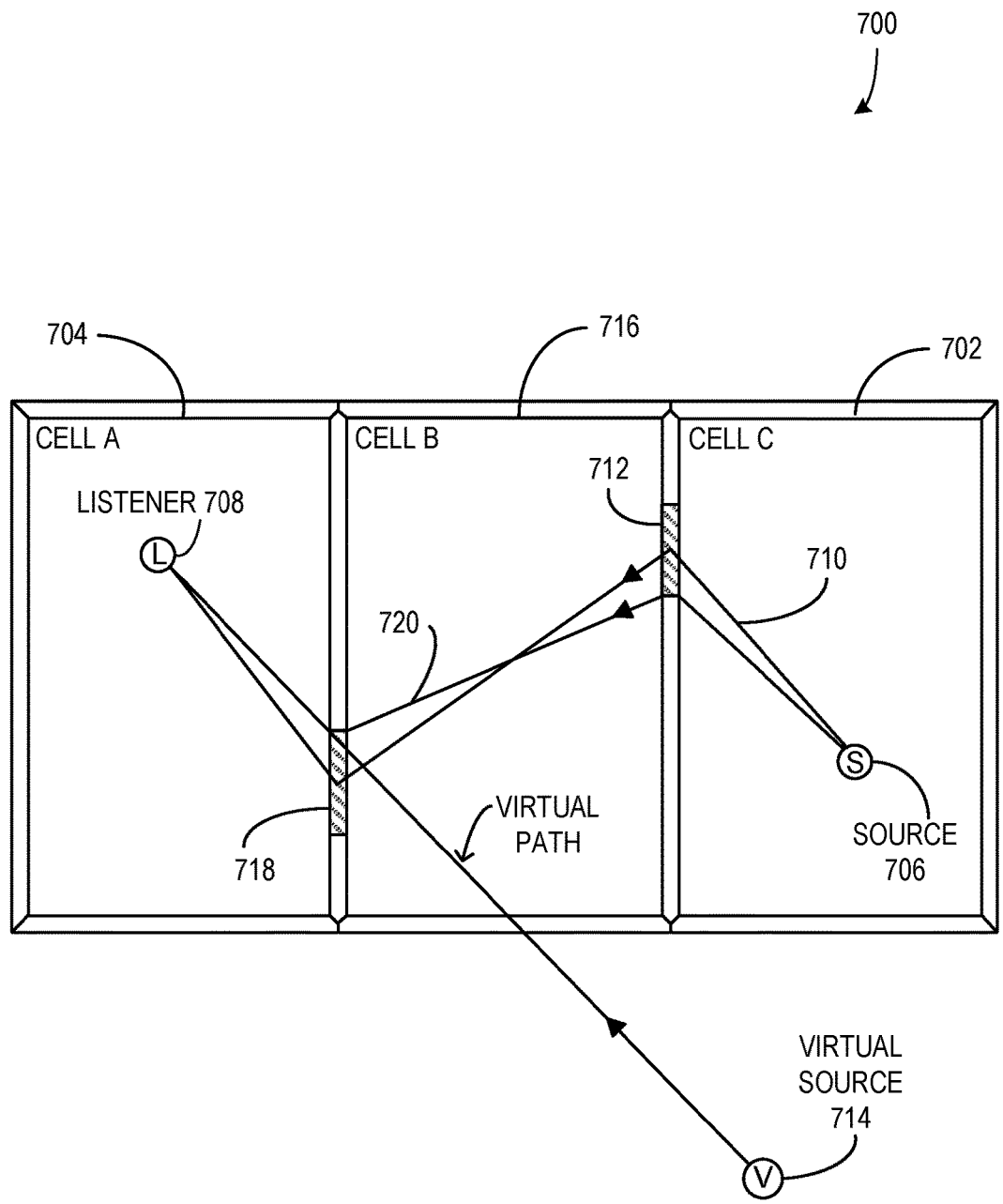
FIG. 7 is an exemplary two-dimensional representation of a virtual environment including three zones and two portals joining the three zones according to an embodiment.

FIG. 7 is an exemplary two-dimensional representation of a virtual environment 700 including three zones and two portals joining the three zones according to an embodiment. The virtual environment 700, similar to virtual environment 600, includes zones 702 and 704, sound source 706, sound destination 708, path 710, portal 712, and virtual sound source 714. Additionally, the virtual environment 700 includes a third zone 716 positioned between zones 702 and 704. The path 710 also traverses a second portal 718 between the zones 704 and 716. Further, a second path 720, which is the result of a string-pull algorithm being applied to the path 710, is also illustrated. The path 710 is shown passing through the centers of the portals 712 and 718, while the path 720 has been 'pulled' to the edges of the portals 712 and 718 to further shorten the path. The virtual sound source 714 has been generated at a distance equal to the length of the path 720 from the sound destination 708 and in the direction of the edge of portal 718 from the sound destination 708.

Figure 8:
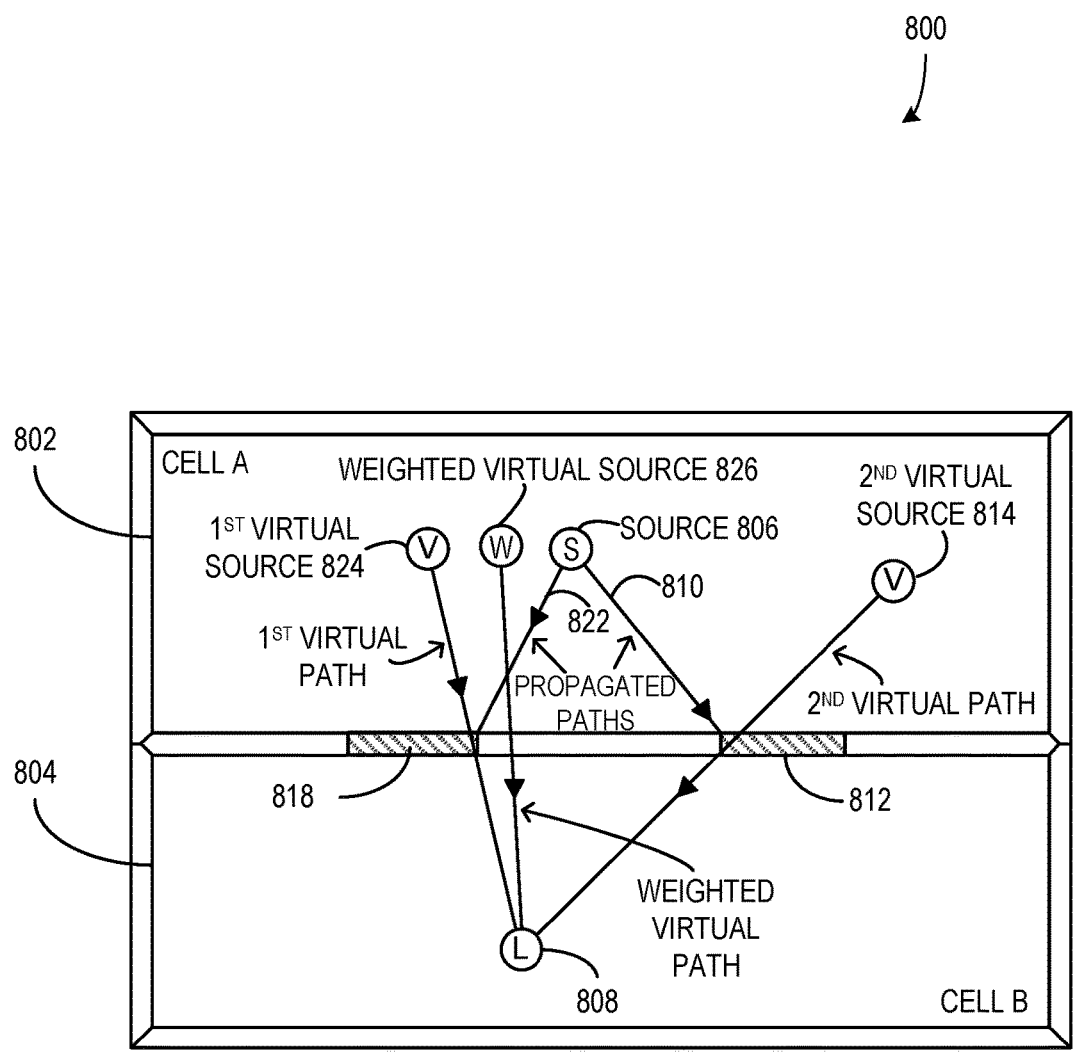
FIG. 8 is an exemplary two-dimensional representation of a virtual environment including two zones and two portals joining the two zones according to an embodiment.

FIG. 8 is an exemplary two-dimensional representation of a virtual environment 800 including two zones and two portals joining the two zones according to an embodiment. The virtual environment 800, similar to virtual environment 600, includes zones 802 and 804, sound source 806, sound destination 808, path 810, portal 812, and virtual sound source 814. Additionally, the virtual environment 800 includes a second portal 818, a second path 822 through the second portal 818, a second virtual sound source 824, and a weighted average virtual source 826. As described above, the paths 810 and 822 through both portals 812 and 818 are identified/calculated and the virtual sources 814 and 824 associated with the paths 810 and 822 are generated at the locations according to the length of the paths 810 and 822 and the directions of the portals 812 and 818 from the sound destination 808. The paths 810 and 822 and/or the virtual sources 814 and 824 are weighted (e.g., by a path weighting module 230, etc.) and a weighted average virtual sound source 826 is generated based on the combination of the weights of the virtual sources 814 and 824. In an example, the virtual sound source 824 is weighted more heavily than the virtual sound source 814 because the path 822 is shorter and/or more direct than the path 810. As described above, the weights may be based on path length, path obstruction, amount of diffraction along the path, etc.

Figure 9:
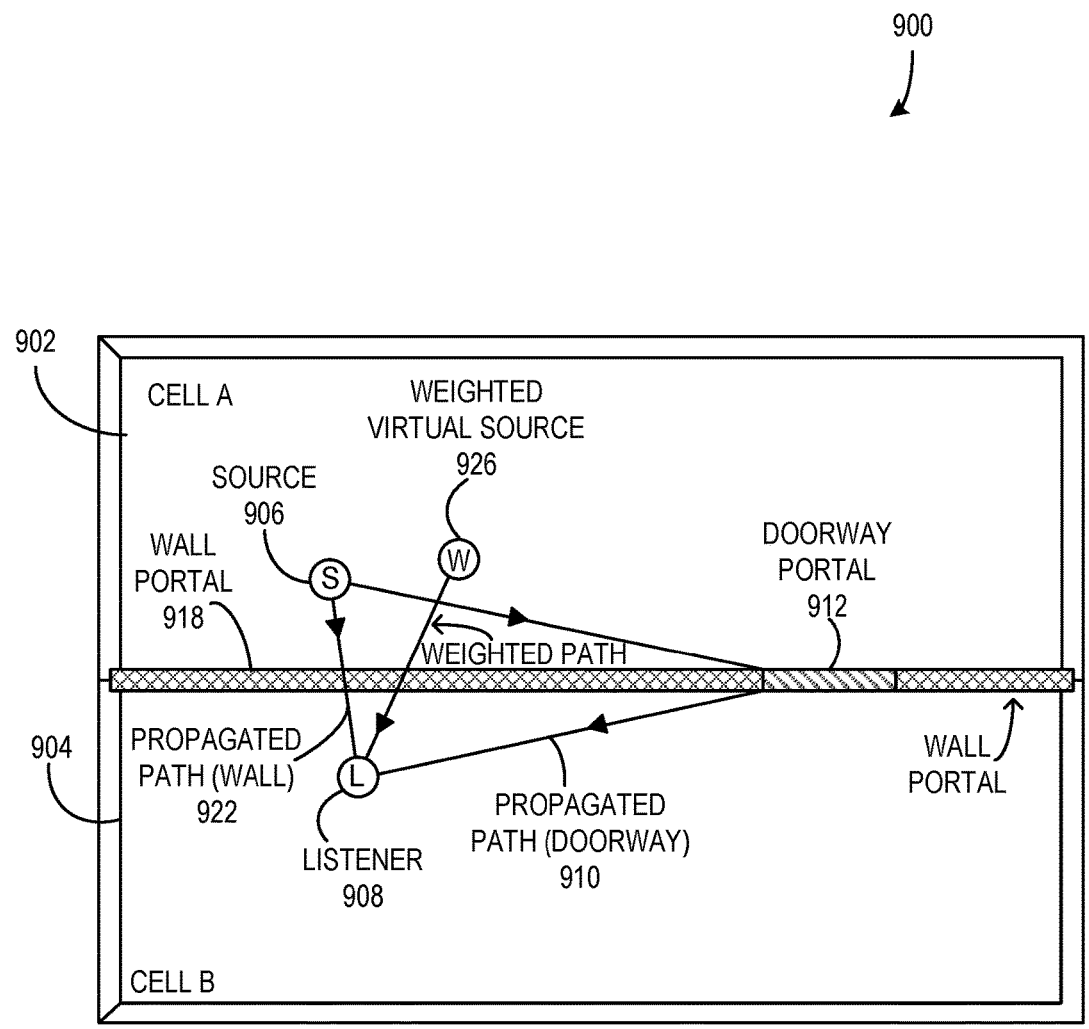
FIG. 9 is an exemplary two-dimensional representation of a virtual environment including two zones and two portals with different transmissivities joining the two zones according to an embodiment.

FIG. 9 is an exemplary two-dimensional representation of a virtual environment 900 including two zones and two portals with different transmissivities joining the two zones according to an embodiment. The virtual environment 900, similar to virtual environment 600, includes zones 902 and 904, sound source 906, sound destination 908, path 910, and a portal 912. Further, the virtual environment includes a wall portal 918, a second path 922, and a weighted average virtual sound source 926. In an example, the portals 912 and 918 have differing transmissivity values. For instance, portal 912 may be an open door with a high transmissivity while portal 918 may be a wall with low transmissivity. The weighted average virtual source 926 is based on the weights of the paths 910 and 922, which may be determined based on the length of the paths, the obstructions associated with the path, and the effect of portal transmissivity on the paths, as described above. In a further example, at runtime, the door portal 912 may transition from open to closed, decreasing the transmissivity of the portal 912. As the door closes, the weighted average virtual sound source 926 may shift away from the portal 912 due to the decreased transmissivity associated with the path 910.

Figure 10:
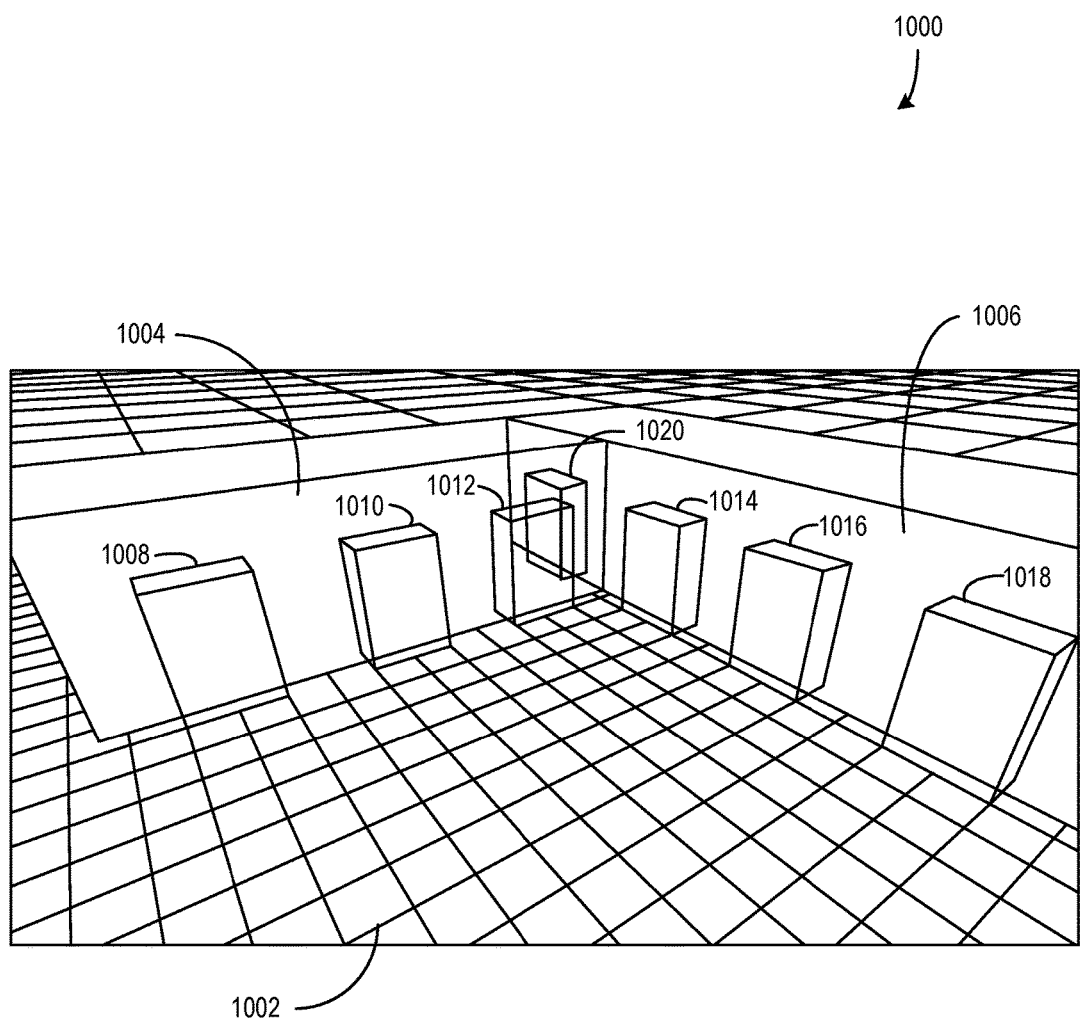
FIG. 10 is an exemplary three-dimensional representation of a virtual environment including several zones and several portals joining the several zones according to an embodiment.

FIG. 10 is an exemplary three-dimensional representation of a virtual environment 1000 including several zones and several portals joining the several zones according to an embodiment. The virtual environment 1000 includes zones 1002, 1004, and 1006 which are adjacent to each other. Zones 1002 and 1004 are linked directly by portals 1008, 1010, and 1012. Zones 1002 and 1006 are linked directly by 1014, 1016, and 1018. Zones 1004 and 1006 are linked directly by 1020.

Figure 11:
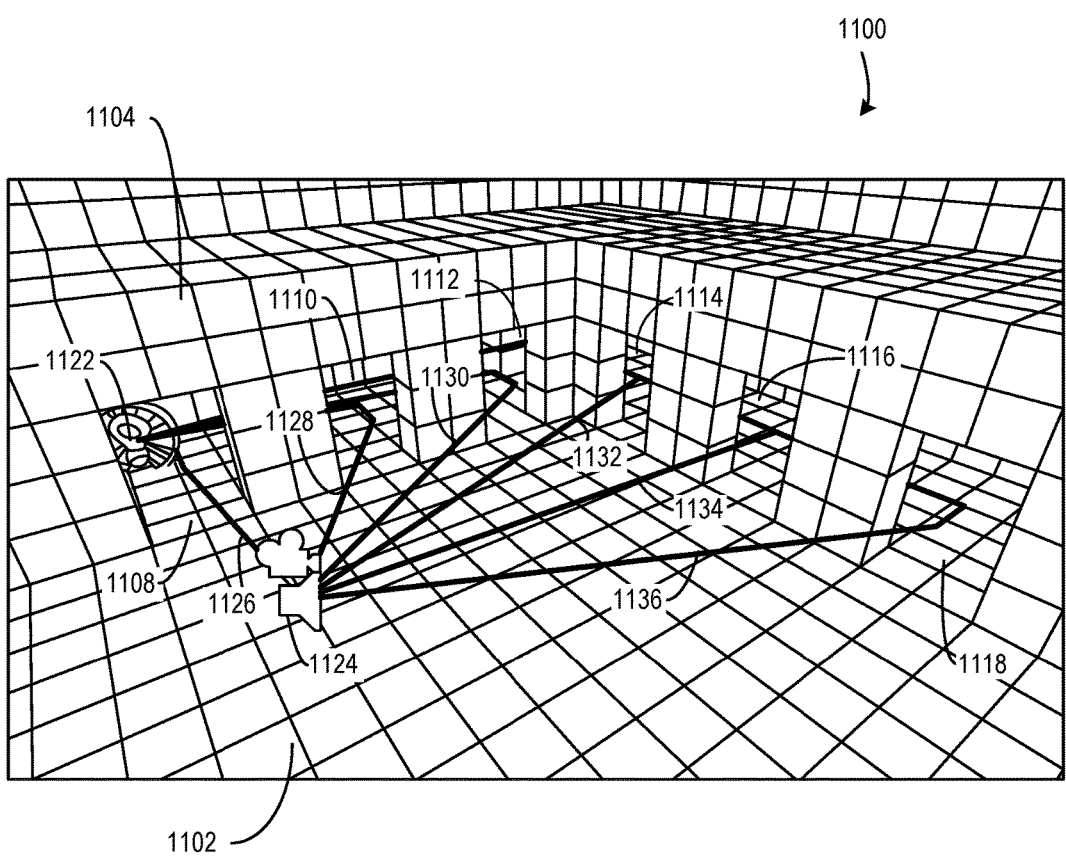
FIG. 11 is an exemplary three-dimensional representation of a virtual environment including several zones, several portals joining the several zones, and valid paths through the several portals according to an embodiment.

FIG. 11 is an exemplary three-dimensional representation of a virtual environment 1100 including several zones, several portals joining the several zones, and valid paths through the several portals according to an embodiment. The virtual environment 1100, similar to the virtual environment 1000 in FIG. 10, includes zones 1102 and 1104 and portals 1108, 1110, 1112, 1114, 1116, and 1118. Further, a sound source 1122 and sound destination 1124 are included. The paths 1126-1136 between the sound source 1122 and the sound destination 1124 are shown traversing each of the portals 1108-1118 between the two zones 1102 and 1104.

Figure 12:
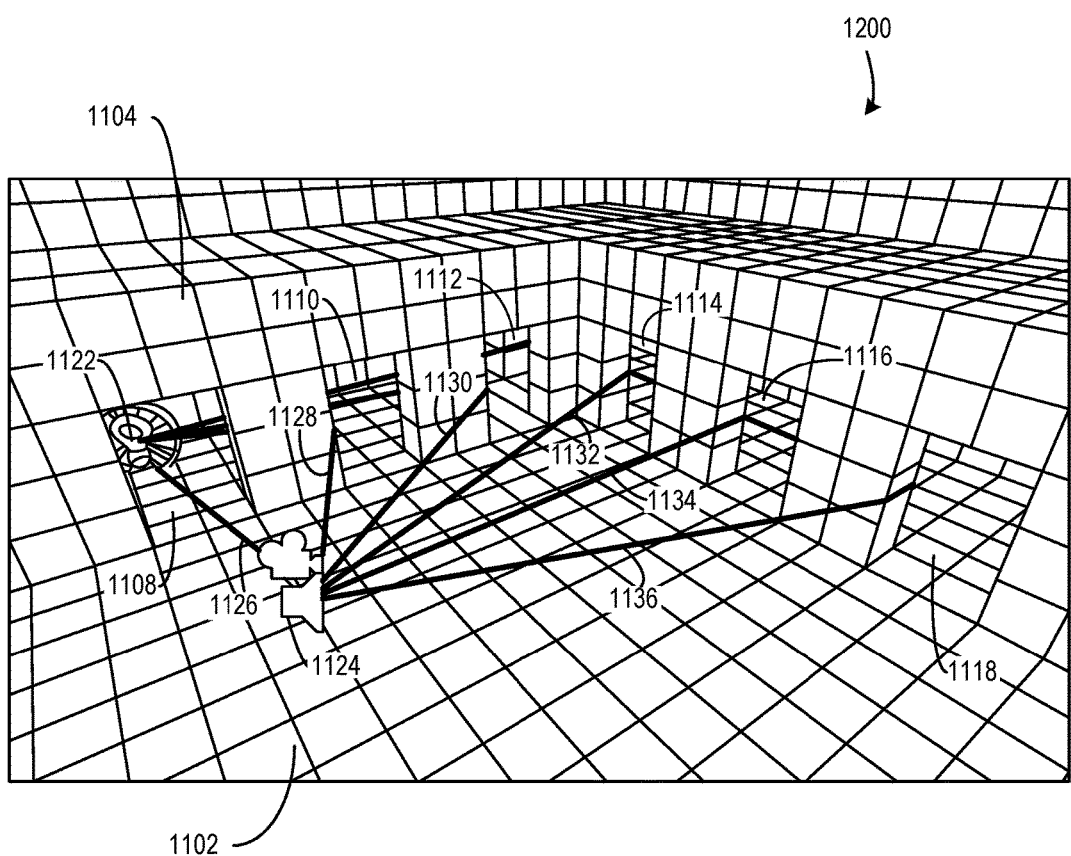
FIG. 12 is an exemplary three-dimensional representation of the virtual environment of FIG. 11 wherein the valid paths are pulled tight with respect to the portals according to an embodiment.

FIG. 12 is an exemplary three-dimensional representation of a virtual environment 1200 wherein the valid paths 1126-1136 from the virtual embodiment 1100 of FIG. 11 are pulled tight with respect to the portals according to an embodiment. As described above, after being pulled tight based on a string-pull algorithm, the valid paths 1126-1136 traverse portals 1108-1118 along the edge in order to minimize the length of the paths 1126-1136.

Figure 13:
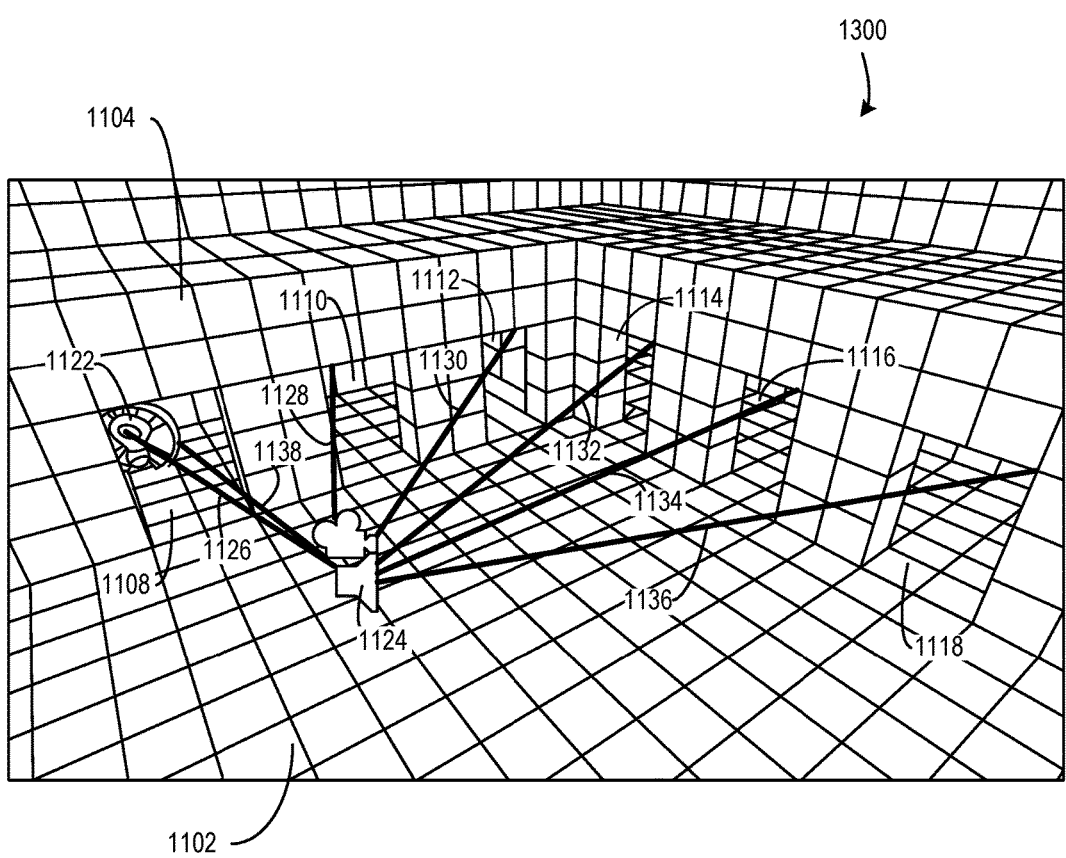
FIG. 13 is an exemplary three-dimensional representation of the virtual environment of FIGS. 11-12 including a weighted average path of the valid paths according to an embodiment.

FIG. 13 is an exemplary three-dimensional representation of a virtual environment 1300 including a weighted average path 1138 of the valid paths 1126-1136 of FIGS. 11-12 according to an embodiment. Each of the valid paths 1126-1136 has been weighted based on the factors described above to create the weighted average path 1138 and, in some examples, an associated weighted average virtual sound source as described above. The weighted average path 1138 is close to the valid path 1126, demonstrating that the valid path 1126, which is a direct path from the sound source 1122 to the sound destination 1124, is heavily weighted in comparison to the other valid paths 1128-1136.

Figure 14:
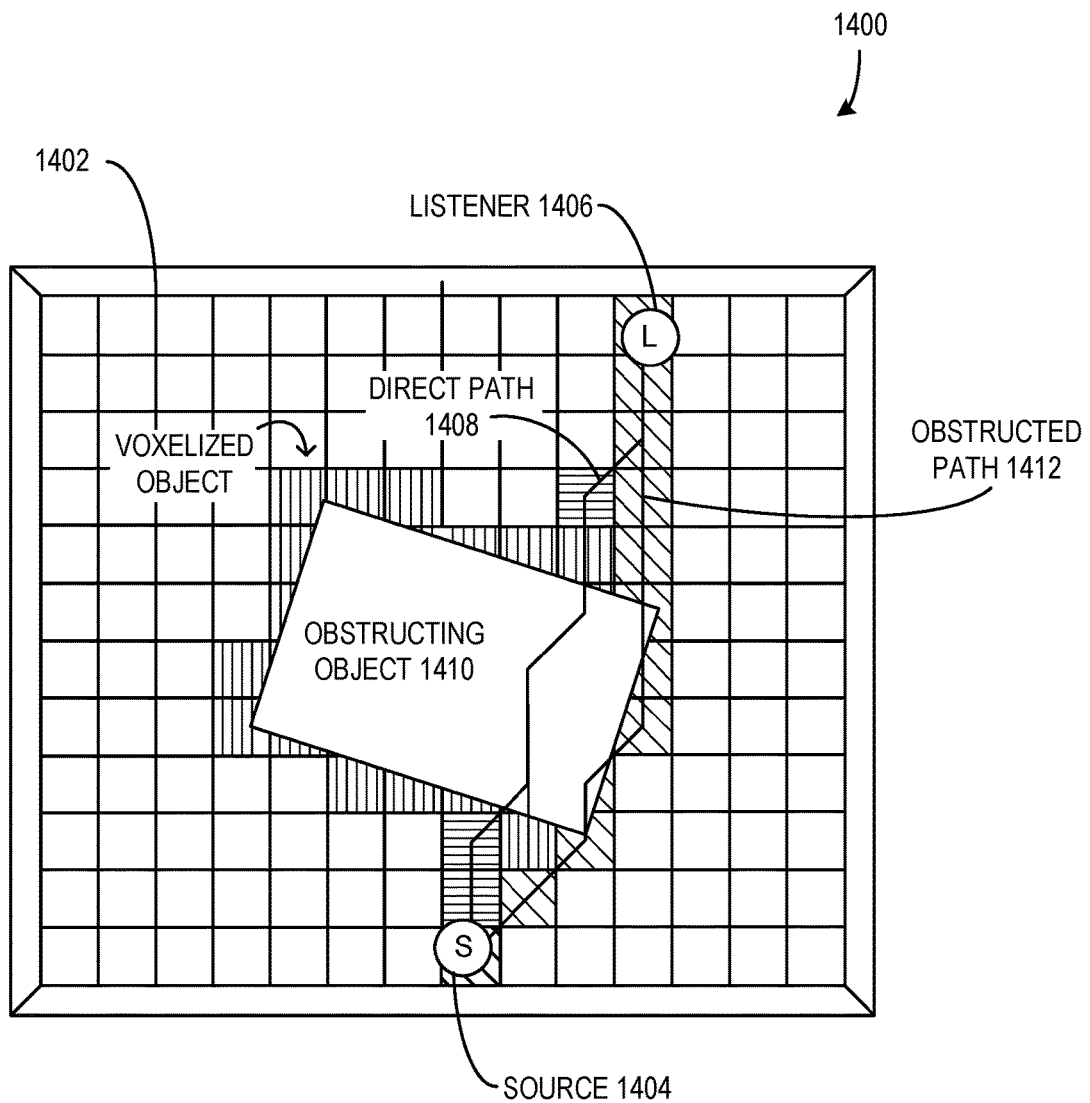
FIG. 14 is an exemplary two-dimensional representation of a voxelized virtual environment including a direct voxel path and an obstructed voxel path according to an embodiment.

FIG. 14 is an exemplary two-dimensional representation of a voxelized virtual environment 1400 including a direct voxel path 1408 and an unobstructed voxel path 1412 according to an embodiment. The zone 1402 includes a sound source 1404 and a sound destination 1406. A direct voxel path 1408 is shown between the sound source 1404 and the sound destination 1406. The voxel path 1408 is made up of voxels, such that the voxels of the voxel path 1408 are the voxels that a straight line between the sound source 1404 and the sound destination 1406 passes through the voxels of the voxel path 1408. However, the voxel path 1408 is obstructed by the obstructing object 1410. An unobstructed path 1412 is determined by circumventing the voxels that are occupied by the obstructing object 1410. As described above, a comparison of the lengths of the voxel path 1408 and the voxel path 1412 may be used to determine an attenuation of audio data associated with the sound source 1404.

Figure 15:
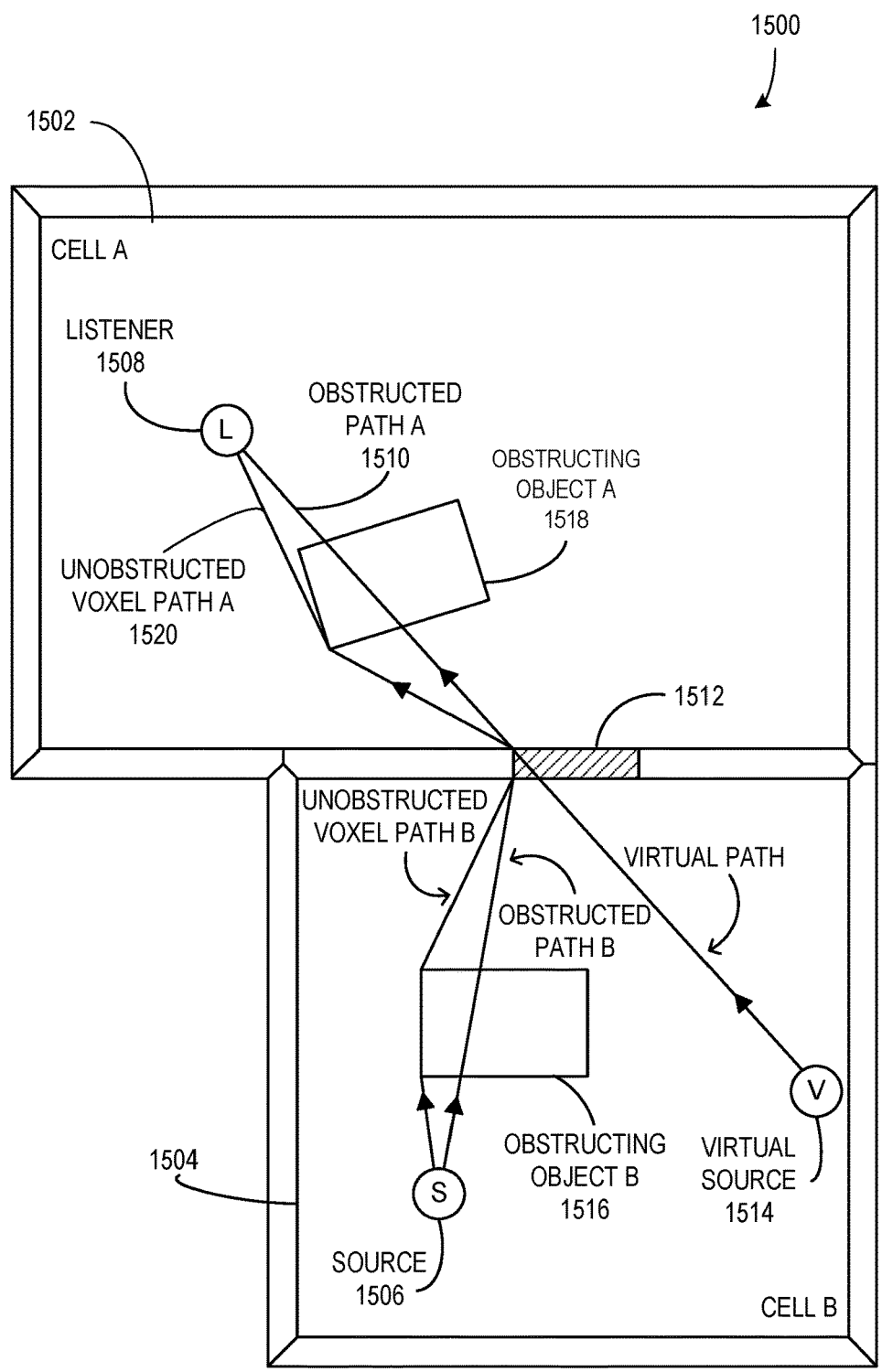
FIG. 15 is an exemplary two-dimensional representation of a virtual environment including two zones, a portal joining the two zones, and unobstructed voxel paths through the two zones according to an embodiment.

FIG. 15 is an exemplary two-dimensional representation of a virtual environment 1500 including two zones, a portal joining the two zones, and unobstructed voxel paths through the two zones according to an embodiment. The zones 1502 and 1504 are linked by a portal 1512. The zone 1502 includes a sound destination 1508 and an obstructing object 1518 and the zone 1504 includes a sound source 1506 and an obstructing object 1516. As described herein, a path 1510 between the sound source 1506 and the sound destination 1508 via the portal 1512 is calculated. Based on the path 1510 and the location of the sound destination 1508, a virtual sound source 1514 is generated. Further, a path 1520 circumventing the obstructing objects 1518 and 1516 is determined. An obstruction value of the path 1520 may be determined based on a comparison of the lengths of the paths 1510 and 1520. The obstruction value may be applied to audio data associated with the sound source 1506 to attenuate, limit, or filter the audio data based on the obstructions. The attenuated audio data may then be associated with the virtual sound source 1514, such that the sound propagation process accounts for both the travel of sound from zone 1504 to zone 1502 via the portal 1512 and the effect of the obstructing objects 1516 and 1518 within the zones 1504 and 1502.

Figure 17:
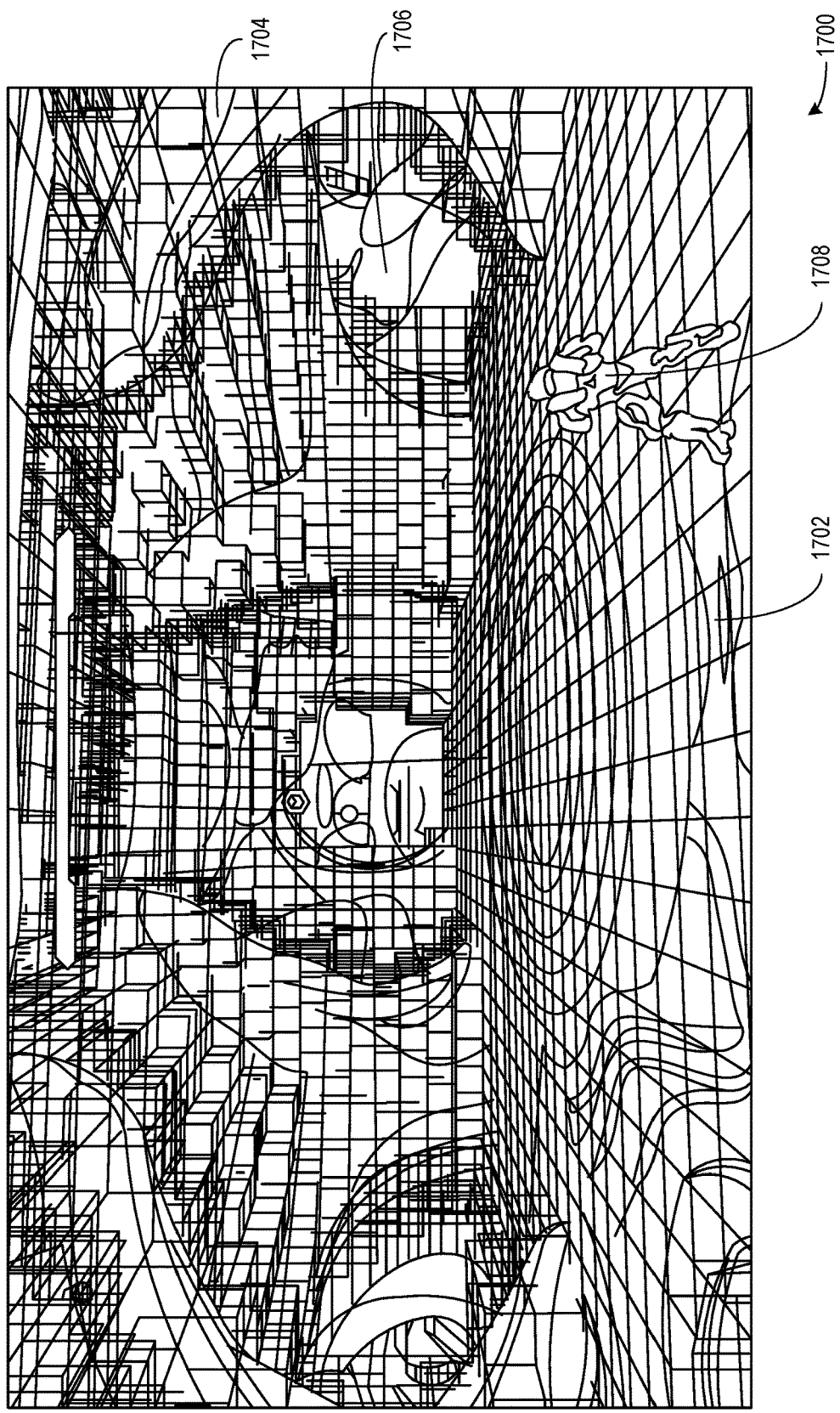
FIG. 17 is an exemplary image of a three-dimensional voxelized virtual environment according to an embodiment.

FIG. 17 is an exemplary image of a three-dimensional voxelized virtual environment according to an embodiment. The virtual environment 1700 includes a variety of rendered surfaces that make up the features of the virtual environment 1700. The surfaces include a flat floor, contoured walls, and openings in the walls. A character, which may be controlled by and/or provide a perspective for a user (e.g., as a sound destination, etc.), is present in the virtual environment 1700. Voxels (in cube form) are overlaid on the various surfaces, demonstrating volumes of the virtual environment 1700 that are obstructed according to the description herein.

Additional Example Scenarios

Aspects of the disclosure enables various scenarios, such as next described.

In an example, a sound source and sound destination are in adjacent zones joined by a plurality of portals. The sound source moves around in its zone in relation to the sound destination and the plurality of portals. As the sound source moves, weighted average virtual sound sources are generated at regular intervals that reflect the movement of the sound source with respect to the plurality of portals.

In another example, a sound destination is in a first zone which is nested inside a second zone. A sound source is in the second zone outside of the sound destination's zone. A plurality of portals connects the first zone and the second zone. A weighted average virtual sound source is generated that is located generally in the direction of the sound source, reflecting a heavier weight applied to the more direct paths between the sound source and the sound destination.

In another example, a sound destination is in a first zone that is moving in relation to a second zone and a sound source contained therein. The first zone and second zone are connected by a portal. As the first zone moves past the second zone, weighted average virtual sound sources are generated at regular intervals such that a listening entity at the sound destination location perceives the sound of the sound source smoothly moving past the sound destination via the portal.

Exemplary Operating Environment

Figure 16:
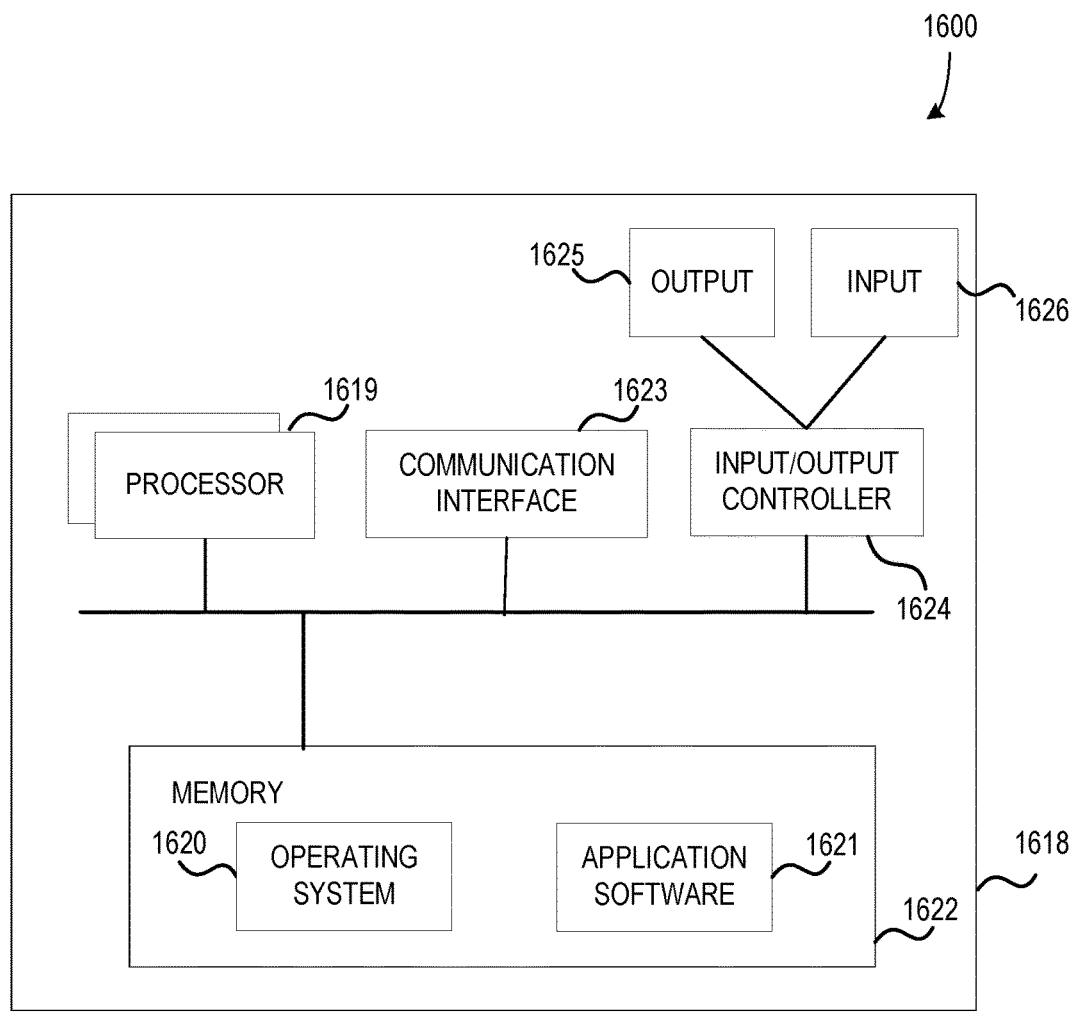
FIG. 16 illustrates a computing apparatus according to an embodiment as a functional block diagram.

The present disclosure is operable with a computing apparatus according to an embodiment as a functional block diagram 1600 in FIG. 16. In an embodiment, components of a computing apparatus 1618 may be implemented as a part of an electronic device according to one or more embodiments described in this specification. The computing apparatus 1618 comprises one or more processors 1619 which may be microprocessors, controllers or any other suitable type of processors for processing computer executable instructions to control the operation of the electronic device. Platform software comprising an operating system 1620 or any other suitable platform software may be provided on the apparatus 1618 to enable application software 1621 to be executed on the device. According to an embodiment, the propagation of sound throughout zones and portals of a virtual environment may be accomplished by software.

Computer executable instructions may be provided using any computer-readable media that are accessible by the computing apparatus 1618. Computer-readable media may include, for example, computer storage media such as a memory 1622 and communications media. Computer storage media, such as a memory 1622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1622) is shown within the computing apparatus 1618, it will be appreciated by a person skilled in the art, that the storage may be distributed or located remotely and accessed via a network or other communication link (e.g. using a communication interface 1623).

The computing apparatus 1618 may comprise an input/output controller 1624 configured to output information to one or more output devices 1625, for example a display or a speaker, which may be separate from or integral to the electronic device. The input/output controller 1624 may also be configured to receive and process an input from one or more input devices 1626, for example, a keyboard, a microphone or a touchpad. In one embodiment, the output device 1625 may also act as the input device. An example of such a device may be a touch sensitive display. The input/output controller 1624 may also output data to devices other than the output device, e.g. a locally connected printing device. In some embodiments, a user 1627 may provide input to the input device(s) 1626 and/or receive output from the output device(s) 1625.

The functionality described herein can be performed, at least in part, by one or more hardware logic components. According to an embodiment, the computing apparatus 1618 is configured by the program code when executed by the processor 1619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, etc.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for propagating sound in a virtual environment comprising:
    at least one processor; and
    at least one memory comprising computer program code, the at least one memory and the computer program code configured to, with the at least one processor, cause the at least one processor to:
    calculate a shortest path from a sound source in a first zone of the virtual environment to a sound destination in a second zone of the virtual environment that passes through at least one portal;
    determine a direction of the calculated shortest path from the at least one portal to the sound destination;

generate a virtual sound source at a distance from the sound destination equal to the length of the calculated shortest path and in the determined direction from the sound destination; and provide the virtual sound source to an audio engine for rendering to a user.

The system described above, wherein the at least one portal includes a transmissivity value; and wherein generating the virtual sound source includes attenuating audio data associated with the virtual sound source based on the transmissivity value of the at least one portal.

The system described above, wherein the virtual sound source is regenerated based on the transmissivity value of the at least one portal when the transmissivity value of the at least one portal changes during runtime.

The system described above, the at least one memory and the computer program code configured to, with the at least on processor, further cause the at least one processor to:
 calculate a plurality of valid paths from the sound source in the first zone to the sound destination in the second zone that pass through at least one portal; and
 apply weights to the plurality of valid paths;
 wherein calculating the shortest path includes determining a weighted average path based on the weights applied to the valid paths;
 determining the direction of the calculated shortest path includes determining a direction of the weighted average path; and
 generating a virtual sound source includes generating a weighted average virtual sound source based on the direction of the weighted average path and the length of the weighted average path.

The system described above, the at least one memory and the computer program code configured to, with the at least on processor, further cause the at least one processor to:
 generate a zone graph of the virtual environment including the first and second zones and the at least one portal;
 wherein calculating the plurality of valid paths includes calculating a plurality of valid paths via the generated zone graph.

The system described above, wherein the plurality of valid paths includes paths through all portals associated with the second zone.

The system described above, wherein the weights are applied to the plurality of valid paths based on at least one of path length, path obstruction, portal transmissivity, or total diffraction angle of the path.

The system described above, wherein the first zone is positioned within the second zone.

The system described above, wherein the shortest path is recalculated, the direction is determined based on the recalculated shortest path, and the virtual sound source is regenerated based on the recalculated shortest path and determined direction when one of the sound source or the sound destination move within the virtual environment at runtime.

The system described above, the at least one memory and the computer program code configured to, with the at least on processor, further cause the at least one processor to:
 calculate a diffraction value of the calculated shortest path based on accumulated angles of the calculated shortest path;
 wherein generating the virtual sound source includes attenuating audio data associated with the virtual sound source based on the calculated diffraction value.

The system described above, wherein the first zone and the second zone are connected via a first portal linking the first zone and the third zone and a second portal linking the third zone and the second zone; and
 calculating the shortest path from the sound source to the sound destination includes calculating a path from the first portal to the second portal through the third zone.

A computerized method for propagating sound in a voxelized virtual environment comprising:
 determining a first voxel path in a straight line from a sound source in the virtual environment to a sound destination in the virtual environment, wherein the sound source is associated with audio data;
 determining a second voxel path of a shortest path circumventing one or more obstructions from the sound source to the sound destination;
 comparing a length of the first voxel path to a length of the second voxel path and attenuating the audio data based on the comparison; and
 providing the attenuated audio data to an audio engine for rendering to a user.

The computerized method described above, wherein the voxelized virtual environment includes a voxelized zone in which the sound source and the sound destination are located, the voxelized zone including a voxel grid.

The computerized method described above, wherein the voxel grid is a three-dimensional grid of binary digits, wherein the binary digits indicate an obstructed status of an associated voxel within the voxelized zone.

The computerized method described above, wherein determining the second voxel path includes determining a path through voxels that are unobstructed based on the obstructed status of the voxels indicated in the voxel grid.

One or more computer storage media having computer-executable instructions for propagating sound in a virtual environment that, upon execution by a processor, cause the processor to at least:
 calculate a shortest path from a sound source in a first zone of the virtual environment to a sound destination in a second zone of the virtual environment that passes through at least one portal;
 determine a direction of the calculated shortest path from the at least one portal to the sound destination;
 generate a virtual sound source at a distance from the sound destination equal to the length of the calculated shortest path and in the determined direction from the sound destination;
 determine a first voxel path of the calculated shortest path from the sound source to the sound destination via the at least one portal, wherein the sound source is associated with audio data;
 determine a second voxel path of a shortest path circumventing one or more obstructions from the sound source to the sound destination via the at least one portal;
 compare the length of the first voxel path to the length of the second voxel path and attenuating the audio data based on the comparison; and
 provide the virtual sound source and the attenuated audio data to an audio engine for rendering to a user.

The one or more computer storage media described above, wherein the at least one portal includes a transmissivity value; and wherein generating the virtual sound source includes attenuating the audio data associated with the sound source based on the transmissivity value of the at least one portal.

The one or more computer storage media described above, wherein the virtual sound source is regenerated based on the transmissivity value of the at least one portal when the transmissivity value of the at least one portal changes during runtime.

The one or more computer storage media described above, wherein the computer-executable instructions for propagating sound in a virtual environment that, upon execution by a processor, further cause the processor to at least:

calculate a plurality of valid paths from the sound source in the first zone to the sound destination in the second zone that pass through at least one portal; and apply weights to the plurality of valid paths;
  wherein calculating the shortest path includes determining a weighted average path based on the weights applied to the valid paths;
  determining the direction of the calculated shortest path includes determining a direction of the weighted average path; and
  generating a virtual sound source includes generating a weighted average virtual sound source based on the direction of the weighted average path and the length of the weighted average path.

The one or more computer storage media described above, wherein determining a first voxel path of the calculated shortest path from the sound source to the sound destination via the at least one portal includes determining a first voxel path segment between the sound source and the at least one portal and determining a second voxel path segment between the at least one portal and the sound destination;
  wherein determining a second voxel path of a shortest path circumventing one or more obstructions from the sound source to the sound destination via the at least one portal includes determining a third voxel path segment between the sound source and the at least one portal circumventing one or more obstructions and determining a fourth voxel path segment between the at least one portal and the sound destination circumventing one or more obstructions; and
  wherein comparing the length of the first voxel path to the length of the second voxel path includes comparing a length of the first voxel path segment to a length of the third voxel path segment and comparing a length of the the second voxel path segment to a length of the fourth voxel path segment.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for propagating sound through a virtual environment comprising zones and portals. The illustrated one or more processors 1619 together with the computer program code stored in memory 1622 constitute exemplary processing means for calculating paths through the zones, portals, and obstructions in order to propagate sound through the virtual environment.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. One or more computer storage media having computer-executable instructions for propagating sound in a virtual environment that, upon execution by a processor, cause the processor to at least:
  calculate a shortest path from a sound source in a first zone of the virtual environment to a sound destination in a second zone of the virtual environment that passes through at least one portal;
  determine a direction of the calculated shortest path from the at least one portal to the sound destination;
  generate a virtual sound source at a distance from the sound destination equal to the length of the calculated shortest path and in the determined direction from the sound destination;
  determine a first voxel path of the calculated shortest path from the sound source to the sound destination via the at least one portal, wherein the sound source is associated with audio data;
  determine a second voxel path of a shortest path circumventing one or more obstructions from the sound source to the sound destination via the at least one portal;

compare the length of the first voxel path to the length of the second voxel path and attenuating the audio data based on the comparison; and provide the virtual sound source and the attenuated audio data to an audio engine for rendering to a user.

2. The one or more computer storage media of claim 1, wherein the at least one portal includes a transmissivity value; and wherein generating the virtual sound source includes attenuating the audio data associated with the sound source based on the transmissivity value of the at least one portal.

3. The one or more computer storage media of claim 2, wherein the virtual sound source is regenerated based on the transmissivity value of the at least one portal when the transmissivity value of the at least one portal changes during runtime.

4. The one or more computer storage media of claim 1, wherein the computer-executable instructions for propagating sound in a virtual environment that, upon execution by a processor, further cause the processor to at least:

calculate a plurality of valid paths from the sound source in the first zone to the sound destination in the second zone that pass through at least one portal; and apply weights to the plurality of valid paths, wherein calculating the shortest path includes determining a weighted average path based on the weights applied to the valid paths, wherein determining the direction of the calculated shortest path includes determining a direction of the weighted average path, and wherein generating a virtual sound source includes generating a weighted average virtual sound source based on the direction of the weighted average path and the length of the weighted average path.

5. The one or more computer storage media of claim 1, wherein determining a first voxel path of the calculated shortest path from the sound source to the sound destination via the at least one portal includes determining a first voxel path segment between the sound source and the at least one portal and determining a second voxel path segment between the at least one portal and the sound destination;

wherein determining a second voxel path of a shortest path circumventing one or more obstructions from the sound source to the sound destination via the at least one portal includes determining a third voxel path segment between the sound source and the at least one portal circumventing one or more obstructions and determining a fourth voxel path segment between the at least one portal and the sound destination circumventing one or more obstructions; and wherein comparing the length of the first voxel path to the length of the second voxel path includes comparing a length of the first voxel path segment to a length of the third voxel path segment and comparing a length of the second voxel path segment to a length of the fourth voxel path segment.

6. A system for propagating sound in a virtual environment comprising:

at least one processor; and at least one memory comprising computer program code, the at least one memory and the computer program code configured to, with the at least one processor, cause the at least one processor to:

calculate a shortest path from a sound source in a first zone of the virtual environment to a sound destination in a second zone of the virtual environment that passes through at least one portal;

determine a direction of the calculated shortest path from the at least one portal to the sound destination;

generate a virtual sound source at a distance from the sound destination equal to the length of the calculated shortest path and in the determined direction from the sound destination; and provide the virtual sound source to an audio engine for rendering to a user.

7. The system of claim 6, wherein the at least one portal includes a transmissivity value; and wherein generating the virtual sound source includes attenuating audio data associated with the virtual sound source based on the transmissivity value of the at least one portal.

8. The system of claim 7, wherein the virtual sound source is regenerated based on the transmissivity value of the at least one portal when the transmissivity value of the at least one portal changes during runtime.

9. The system of claim 6, the at least one memory and the computer program code configured to, with the at least on processor, further cause the at least one processor to:

calculate a plurality of valid paths from the sound source in the first zone to the sound destination in the second zone that pass through at least one portal; and apply weights to the plurality of valid paths;

wherein calculating the shortest path includes determining a weighted average path based on the weights applied to the valid paths;

determining the direction of the calculated shortest path includes determining a direction of the weighted average path; and generating a virtual sound source includes generating a weighted average virtual sound source based on the direction of the weighted average path and the length of the weighted average path.

10. The system of claim 9, the at least one memory and the computer program code configured to, with the at least on processor, further cause the at least one processor to:

generate a zone graph of the virtual environment including the first and second zones and the at least one portal;

wherein calculating the plurality of valid paths includes calculating a plurality of valid paths via the generated zone graph.

11. The system of claim 9, wherein the plurality of valid paths includes paths through all portals associated with the second zone.

12. The system of claim 9, wherein the weights are applied to the plurality of valid paths based on at least one of path length, path obstruction, portal transmissivity, or total diffraction angle of the path.

13. The system of claim 6, wherein the first zone is positioned within the second zone.

14. The system of claim 6, wherein the shortest path is recalculated, the direction is determined based on the recalculated shortest path, and the virtual sound source is regenerated based on the recalculated shortest path and determined direction when one of the sound source or the sound destination move within the virtual environment at runtime.

15. The system of claim 6, the at least one memory and the computer program code configured to, with the at least on processor, further cause the at least one processor to:

calculate a diffraction value of the calculated shortest path based on accumulated angles of the calculated shortest path;

wherein generating the virtual sound source includes attenuating audio data associated with the virtual sound source based on the calculated diffraction value.

16. The system of claim 6, wherein the first zone and the second zone are connected via a first portal linking the first zone and the third zone and a second portal linking the third zone and the second zone; and calculating the shortest path from the sound source to the sound destination includes calculating a path from the first portal to the second portal through the third zone.

17. A computerized method for propagating sound in a voxelized virtual environment performed by a processor of a computing device, the computerized method comprising:

determining a first voxel path in a straight line from a sound source in the virtual environment to a sound destination in the virtual environment, wherein the sound source is associated with audio data;

determining a second voxel path of a shortest path circumventing one or more obstructions from the sound source to the sound destination;

comparing a length of the first voxel path to a length of the second voxel path and attenuating the audio data based on the comparison; and providing the attenuated audio data to an audio engine for rendering to a user.

18. The computerized method of claim 17, wherein the voxelized virtual environment includes a voxelized zone in which the sound source and the sound destination are located, the voxelized zone including a voxel grid.

19. The computerized method of claim 18, wherein the voxel grid is a three-dimensional grid of binary digits, wherein the binary digits indicate an obstructed status of an associated voxel within the voxelized zone.

20. The computerized method of claim 19, wherein determining the second voxel path includes determining a path through voxels that are unobstructed based on the obstructed status of the voxels indicated in the voxel grid.

* * * * *